US007246014B2

(12) United States Patent
Forth et al.

(10) Patent No.: US 7,246,014 B2
(45) Date of Patent: Jul. 17, 2007

(54) HUMAN MACHINE INTERFACE FOR AN ENERGY ANALYTICS SYSTEM

(75) Inventors: J. Bradford Forth, Victoria (CA); Peter C. Cowan, Victoria (CA); Douglas Stephen Ransom, Victoria (CA); Thomas S. Stevenson, Victoria (CA); Jeffrey W. Yeo, Saanichton (CA)

(73) Assignee: Power Measurement Ltd., Saanichton, British Columbia (CA)

( * ) Notice: Subject to any disclaimer, the term of this patent is extended or adjusted under 35 U.S.C. 154(b) by 585 days.

(21) Appl. No.: 10/774,814

(22) Filed: Feb. 9, 2004

(65) Prior Publication Data

US 2004/0225648 A1 Nov. 11, 2004

Related U.S. Application Data

(60) Provisional application No. 60/445,788, filed on Feb. 7, 2003, provisional application No. 60/445,881, filed on Feb. 7, 2003.

(51) Int. Cl.
*G06F 3/01* (2006.01)

(52) U.S. Cl. ............................ 702/60; 702/57; 702/61; 702/73

(58) Field of Classification Search .................. 702/76, 702/108, 152, 185, 188, 189, 57, 60, 61, 702/73; 700/83, 293; 703/18; 713/300; 705/10

See application file for complete search history.

(56) References Cited

U.S. PATENT DOCUMENTS

| | | | | |
|---|---|---|---|---|
| 4,261,037 | A | 4/1981 | Hicks | 364/464 |
| 4,570,217 | A * | 2/1986 | Allen et al. | 700/83 |
| 5,604,892 | A * | 2/1997 | Nuttall et al. | 703/18 |
| 5,684,710 | A * | 11/1997 | Ehlers et al. | 700/293 |
| 5,758,331 | A | 5/1998 | Johnson | 705/412 |
| 6,775,595 | B1 * | 8/2004 | Yabutani et al. | 700/291 |
| 6,853,978 | B2 * | 2/2005 | Forth et al. | 705/26 |
| 6,859,882 | B2 * | 2/2005 | Fung | 713/300 |

FOREIGN PATENT DOCUMENTS

GB 2148565 A 10/1983

OTHER PUBLICATIONS

PCT International Search Report PCT/IB2004/000720.

* cited by examiner

*Primary Examiner*—Marc S. Hoff
*Assistant Examiner*—Felix Suarez
(74) *Attorney, Agent, or Firm*—Brinks, Hofer, Gilson & Lione

(57) ABSTRACT

An Enterprise Energy Management ("EEM") software system is disclosed that displays EEM data and allows a user to interact with the data to better understand and manage their electrical system. The EEM software system collects real-time, near real-time and historical input data from various data sources, creates useful information from that data by filtering and isolating relevant data and performing analytics on the data, displays that data to the user in an easy to understand format, and allows the user to interact with the displayed data. The EEM software allows the user to perform what-if analysis, make changes in their system and verify results of those changes. The graphical user interfaces provide context sensitive and relevant guidance to novice and expert users.

47 Claims, 24 Drawing Sheets

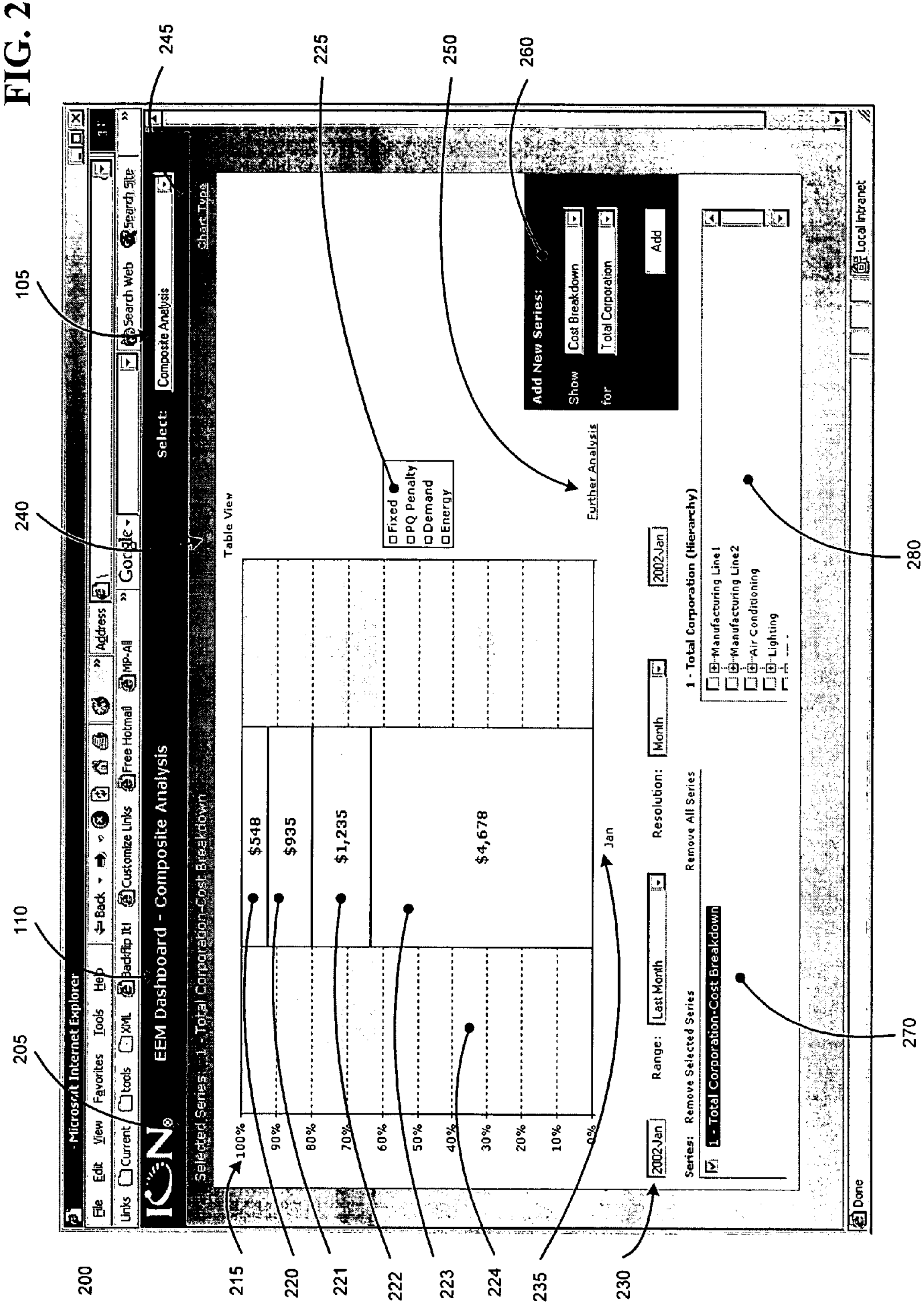
FIG. 2
EEM Dashboard - Composite Analysis
Selected Series: 1 - Total Corporation-Cost Breakdown
Select:
Composite Analysis
Chart Type
Table View
$548
$935
$1,235
$4,678
Jan
Fixed
PQ Penalty
Demand
Energy
Further Analysis
Add New Series:
Show
Cost Breakdown
for
Total Corporation
Add
100%
90%
80%
70%
60%
50%
40%
30%
20%
10%
0%
2002-Jan
Range:
Last Month
Resolution:
Month
Series:
Remove Selected Series
Remove All Series
1 - Total Corporation-Cost Breakdown
1 - Total Corporation (Hierarchy)
Manufacturing Line1
Manufacturing Line2
Air Conditioning
Lighting
Done
Local intranet
200
105
110
205
215
220
221
222
223
224
225
230
235
240
245
250
260
270
280

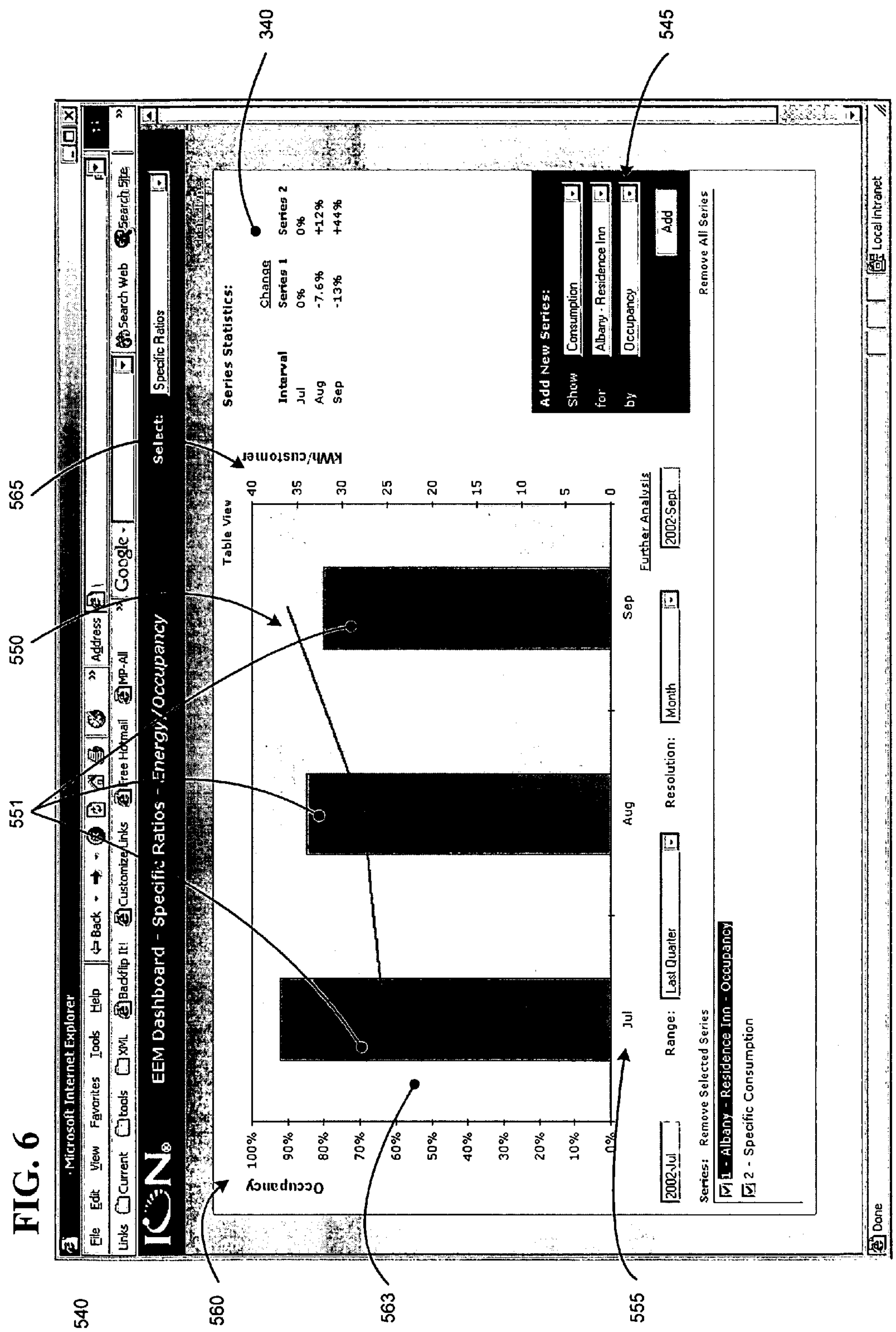
FIG. 6
540
560
563
555
565
550
551
340
545
Microsoft Internet Explorer
EEM Dashboard - Specific Ratios - Energy/Occupancy
Select:
Specific Ratios
Table View
Series Statistics:
Interval
Jul
Aug
Sep
Change
Series 1
0%
-7.6%
-13%
Series 2
0%
+12%
+44%
Add New Series:
Show
Consumption
for
Albany - Residence Inn
by
Occupancy
Add
Remove All Series
Occupancy
kWh/customer
Further Analysis
Range:
Last Quarter
Resolution:
Month
2002-Jul
2002-Sept
Series:
Remove Selected Series
1 - Albany - Residence Inn - Occupancy
2 - Specific Consumption
Done
Local intranet

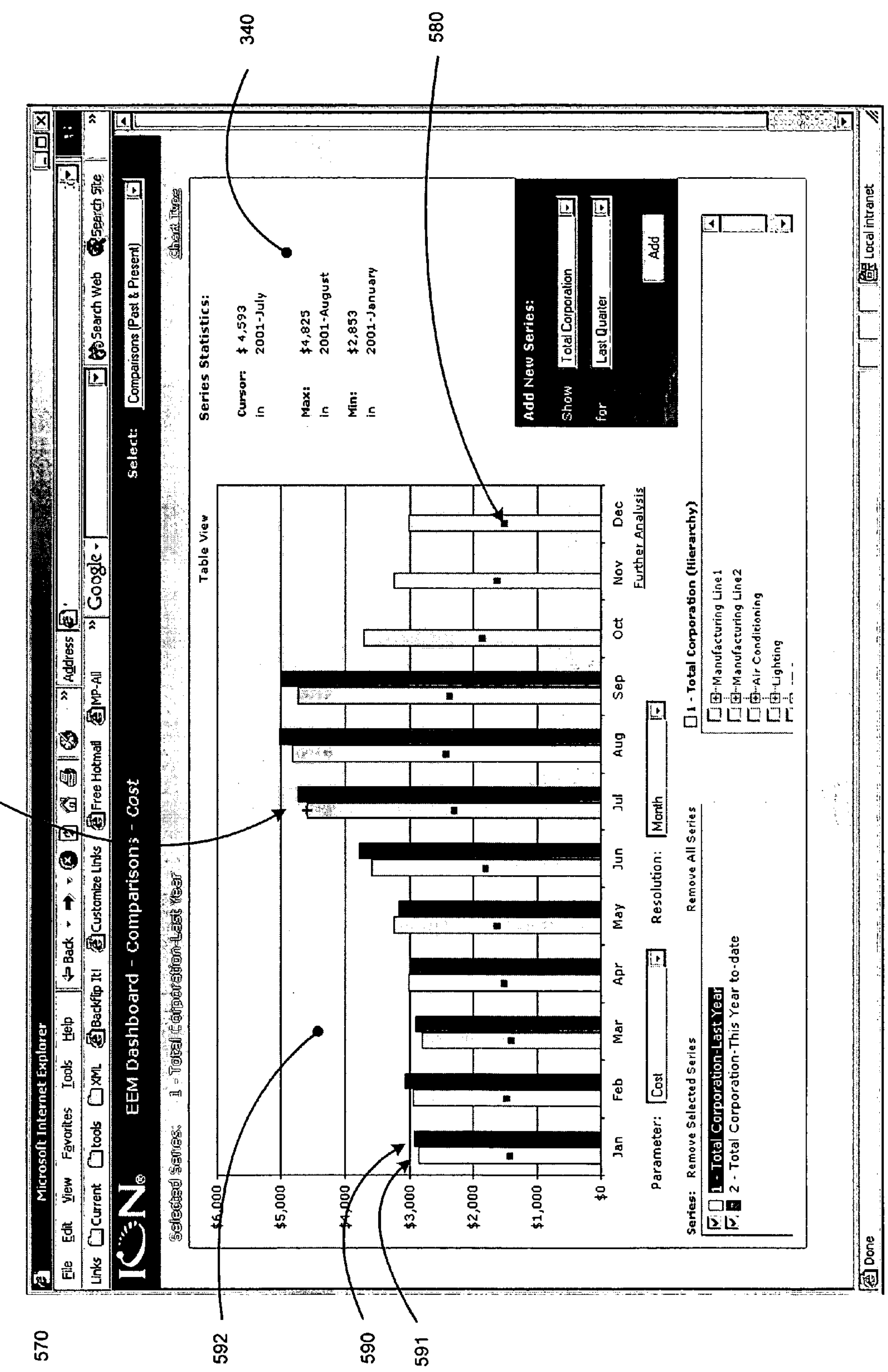
FIG. 7
570
340
580
595
592
590
591
Microsoft Internet Explorer
EEM Dashboard - Comparisons - Cost
Selected Series: 1 - Total Corporation-Last Year
Select: Comparisons (Past & Present)
Table View
Series Statistics:
Cursor: $ 4,593
in 2001-July
Max: $4,825
in 2001-August
Min: $2,853
in 2001-January
Add New Series:
Show Total Corporation
for Last Quarter
Add
$6,000
$5,000
$4,000
$3,000
$2,000
$1,000
$0
Jan
Feb
Mar
Apr
May
Jun
Jul
Aug
Sep
Oct
Nov
Dec
Further Analysis
Parameter: Cost
Resolution: Month
Remove Selected Series
Remove All Series
Series:
1 - Total Corporation-Last Year
2 - Total Corporation-This Year to-date
1 - Total Corporation (Hierarchy)
Manufacturing Line1
Manufacturing Line2
Air Conditioning
Lighting
Done
Local intranet

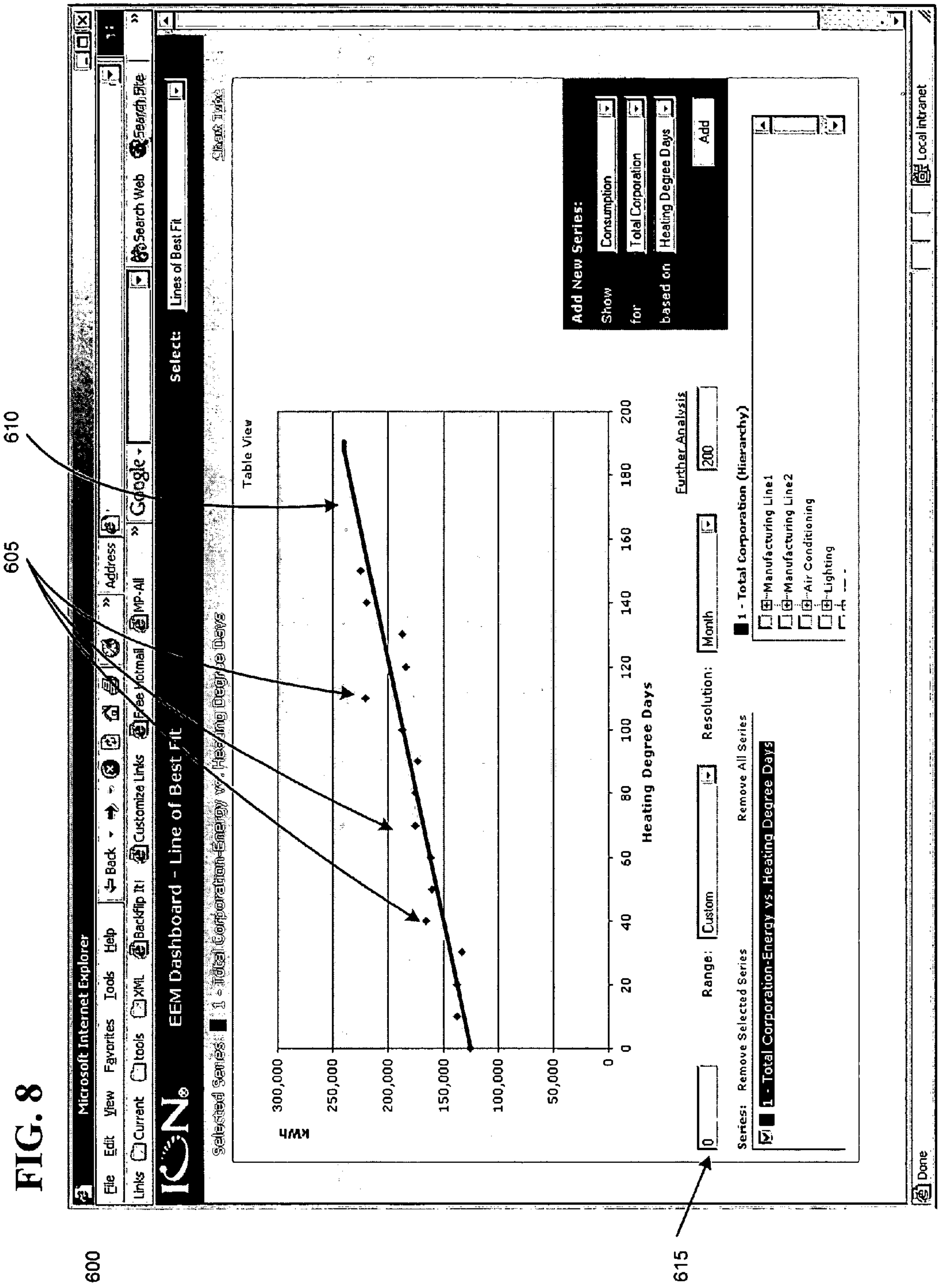
FIG. 8
600
605
610
615
Microsoft Internet Explorer
EEM Dashboard - Line of Best Fit
Selected Series: 1 - Total Corporation-Energy vs. Heating Degree Days
Select: Lines of Best Fit
Table View
kWh
300,000
250,000
200,000
150,000
100,000
50,000
0
0 20 40 60 80 100 120 140 160 180 200
Heating Degree Days
Further Analysis
Range: Custom
Resolution: Month
Series: Remove Selected Series Remove All Series
1 - Total Corporation-Energy vs. Heating Degree Days
1 - Total Corporation (Hierarchy)
Manufacturing Line1
Manufacturing Line2
Air Conditioning
Lighting
Add New Series:
Show Consumption
for Total Corporation
based on Heating Degree Days
Add
Done
Local intranet 0000 H
0600 H
1200 H
1800 H
805
Power MW: 24.67
Cost/min: $40.58
Tariff: 5¢ per kwh
856
857
858

HUMAN MACHINE INTERFACE FOR AN ENERGY ANALYTICS SYSTEM

RELATED APPLICATIONS

The present application claims priority from U.S. Provisional Patent Application No. 60/445,788, entitled HUMAN-MACHINE INTERFACE FOR AN ENERGY ANALYTICS SYSTEM, filed Feb. 7, 2003, and U.S. Provisional Patent Application No. 60/445,881, entitled ENERGY ANALYTICS FOR AN ENERGY DISTRIBUTION SYSTEM, filed Feb. 7, 2003, which is related to U.S. patent application Ser. No. 10/340,374, entitled PUSH COMMUNICATIONS ARCHITECTURE FOR INTELLIGENT ELECTRONIC DEVICES, filed Jan. 9, 2003, which is a continuation-in-part under 37 CFR § 1.53(b) of U.S. patent application Ser. No. 09/896,570, filed Jun. 29, 2001, now U.S. Pat. No. 6,944,555, issued Sep. 13, 2005, which is a continuation-in-part under 37 CFR § 1.53(b) of U.S. patent application Ser. No. 09/814,436, filed Mar. 22, 2001, now U.S. Pat. No. 6,751,562, issued Jun. 15, 2004, which is a continuation-in-part under 37 CFR § 1.53(b) of U.S. patent application Ser. No. 09/723,564, filed Nov. 28, 2000, now U.S. Pat. No. 6,961,641, issued Nov. 1, 2005, and a continuation-in-part under 37 CFR § 1.53(b) of U.S. patent application Ser. No. 10/068,431, filed Feb. 6, 2002, now U.S. Pat. No. 6,694,270, issued Feb. 17, 2004, which is a continuation of U.S. patent application Ser. No. 08/798,723, filed Feb. 12, 1997, now abandoned, the entire disclosures of all of which are herein incorporated by reference.

The following co-pending and commonly assigned U.S. patent applications have been filed concurrently with the present application:

"IDENTIFYING ENERGY DRIVERS IN AN ENERGY MANAGEMENT SYSTEM"), filed herewith, U.S. patent application Ser. No. 10/775,761, the entire disclosures of which is herein incorporated by reference; and "A METHOD AND SYSTEM FOR CALCULATING AND DISTRIBUTING UTILITY COSTS", filed Feb. 6, 2004, U.S. patent application Ser. No. 10/773,488, the entire disclosures of which is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The evolving global energy environment is more closely connecting the needs of large industrial, commercial and institutional energy consumers with those of the power utilities and energy services companies. In some regions, deregulation of the electricity industry is introducing consumer choice, competition amongst energy suppliers, and significant demands on the electrical industry. Beyond price, large energy consumers are increasingly demanding higher value for their energy investment. Many businesses are likewise increasing their expectation that energy will be delivered at high levels of quality and reliability. These factors are driving both the suppliers and consumers of energy to seek better strategies to manage the cost and quality of the energy product and energy assets that produce, deliver, control and consume it. There are several fundamental challenges: the need to support the economic and efficient delivery, purchasing and use of energy; the need to guarantee higher levels of power quality and reliability; and, the need to supply the increasing demand for energy in a market based pricing system.

Users and suppliers of energy are well positioned to take advantage of these opportunities but the tools to effectively and efficiently manage energy resources and make informed decisions are lacking. There is a lack of understanding on what drives the costs and how they can be reduced by changes in the operational usage patterns of their particular business. Facility managers will also want to normalize usage patterns with respect to occupancy, temperature, weather and other variables in order to accurately project energy requirements into the future and also determine where further efficiencies can be realized.

Historically, energy management has been a difficult task to accomplish for a variety of reasons. Not all forms of energy can be stored successfully for long periods or, in some cases, at all. Purchasing energy to cover short falls can be expensive, so being able to predict and control the use of energy is an excellent way to reduce these costs. Before energy use can be predicted or controlled it must be measured, not only in real-time but also over a period of time to gather data on trends and cycles of energy usage. With historical energy usage data, predictions can be made how energy will be used in the future. Additionally, changes to energy usage can be patterned, modeled and analyzed using historical databases and other non-measured information to see how costs may change.

Using this information, changes in usage patterns can be implemented to optimize the usage of energy assets to meet the goals of the user. Likewise, over time the same energy measurement system can verify that the goals were actually realized, and if not, then help plan further changes as needed. This will help personnel to better manage capital expenditures, extend equipment life and economically schedule maintenance. Reliability of the network can be analyzed and weak points identified for further action. The costs of the loads can be apportioned to the actual uses of energy so the true costs of products and services can be realized.

SUMMARY

The present invention is defined by the following claims, and nothing in this section should be taken as a limitation on those claims. By way of introduction, the preferred embodiments described below relate to an EEM software system that collects real-time, near real-time and historical input data from energy data sources, including EEM data sources, creates useful information from that data by filtering and isolating relevant data and performing analytics on the data, displays the data to the user in an easy to understand format, and allows the user to interact with the displayed data. The EEM software system is also operative to allow the user to perform what-if analysis, make changes in their system and verify results of those changes. The EEM software system is operative to perform these actions automatically as well.

The EEM software system particularly relates to the application and process of displaying EEM data and allowing a user to interact with the EEM data to better understand and manage their energy system. The application exposes patterns, correlations and causalities in raw data. The user can enter queries and view the results, simplifying the user's access to energy analytic data. The EEM software system is operable to run on any platform that has a physical user interface, such as a desktop display, a browser, a hand-held device, a wireless device, Windows Management Console, an Intelligent Energy Device ("IED") and so forth.

The disclosed embodiments provide an intuitive user interface that provides context sensitive and relevant guidance to novice and expert users. Existing general analysis tools require the user to be an expert in understanding the meaning of the relevant data. Without an intimate and accurate understanding of the characteristics of their energy data and how it is related, the user often ends up with a report that means nothing or causes them to come to the wrong conclusion. The graphical user interfaces of the disclosed embodiments are intended to assist the user in making a specific type of analysis. Navigational guides lead the novice user through the system in a logical and simplified way, while predefined limits provide some protection for the novice user from taking unintended actions.

The probability of the user reaching the wrong conclusion is dramatically reduced or eliminated through the use of the graphical user interfaces generated by an EEM software application of the EEM software system. Each graphical user interface provides a summary that allows the user to quickly identify the context of the data, be it location, date or some other context. Color may be employed to provide emphasis and context. The general analysis methods described below can be used in conjunction with one another or linked in a series to provide a comprehensive and logical analysis to the data and the EEM software system.

The disclosed embodiments present a flexible interface that allows the user to manage and control the type and format of the data they are viewing. Various controls are provided to allow the user to select and manage date-time ranges, operational units, analysis methods, energy related drivers, as well as a plethora of other functions. The disclosed embodiments allows the user to drill down into areas of interest or concern, perhaps using OLAP analysis tools such as pivot charts or pivot tables, bringing in other data, or removing irrelevant data.

The disclosed embodiments also allow the user to set limits, thresholds or set points. Any kind of deviation from these preset limits triggers an automatic action by the application. The application can set a flag, send a notification or alarm, print a report, perform further analysis, or take some corrective action. The application can monitor the operating conditions over time to learn what the average for the system is, possibly by employing artificial intelligence ("AI") techniques, and learn how to automatically react to adjust or fine tune operations.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 2 depicts an exemplary Composite Analysis Graphical User Interface;

FIG. 6 depicts an exemplary EEM Specific Ratios Analysis Graphical User Interface;

FIG. 7 depicts an exemplary EEM Comparison Analysis Graphical User Interface;

FIG. 8 depicts an exemplary EEM Best Fit Analysis Graphical User Interface;

DETAILED DESCRIPTION OF THE PRESENTLY PREFERRED EMBODIMENTS

Figure 1A:
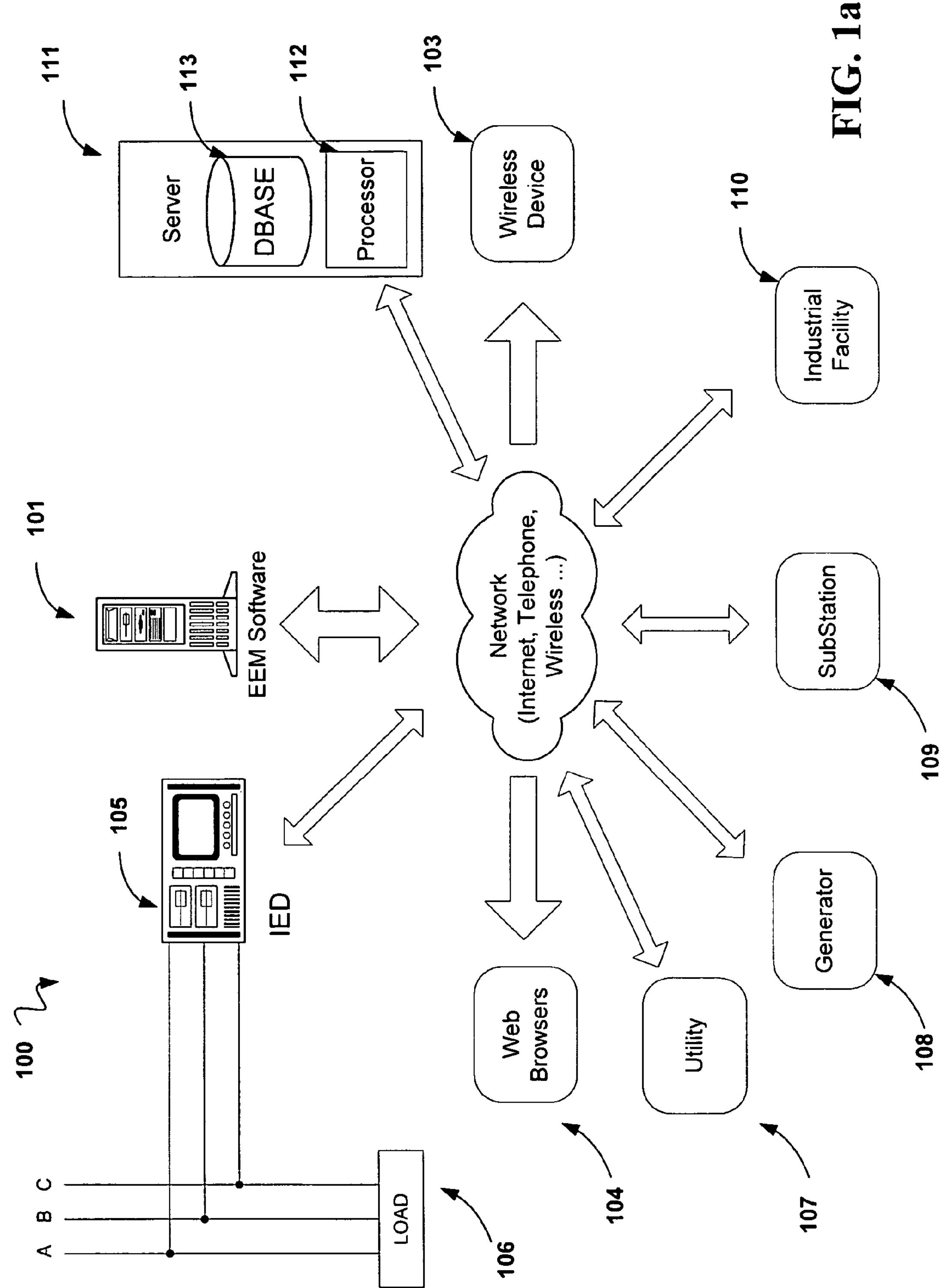
FIG. 1*a* depicts an exemplary EEM software system.

Referring to FIG. 1*a*, the disclosed embodiments relate to an Enterprise Energy Management ("EEM") software system 100 that may collect data from various types of EEM data sources and create useful information based on that data. The EEM software system 100 may also allow a user to perform what-if analysis, make changes in their system, and verify results based on the changes. As illustrated, the EEM software system 100 may include an EEM software server 101 that may be coupled with a network 102. As used herein, the network 102 should be broadly construed to include any one or more of a number of types of networks that may be created between devices using an Internet connection, a LAN/WAN connection, a telephone connection, a wireless connection, and so forth.

Herein, the phrase "coupled with" is defined to mean directly connected to or indirectly connected through one or more intermediate components. Such intermediate components may include both hardware and software based components.

A plurality of Intelligent Electronic Devices ("IEDs") 105 may be coupled with the EEM software server 101. The IEDs 105 may be coupled with a load 106, which the IEDs 105 are responsible for monitoring and reporting various types of energy data related to the load 106. IEDs 105 may include revenue electric watt-hour meters, protection relays, programmable logic controllers, remote terminal units, fault recorders and other devices used to monitor and/or control electrical power distribution and consumption. IEDs 105 are widely available that make use of memory and microprocessors to provide increased versatility and additional functionality. Such functionality includes the ability to communicate with other hosts and remote computing systems through some form of communication channel. IEDs 105 also include legacy mechanical or electromechanical devices that have been retrofitted with appropriate hardware and/or software allowing integration with the EEM system.

An IED 105 may be associated with a particular load or set of loads that are drawing electrical power from the power distribution system. The IED 105 may also be capable of receiving data from or controlling its associated load. Depending on the type of IED 105 and the type of load it may be associated with, the IED 105 may implement a energy management function that is able to respond to, implement and/or generate further management functions, measure energy consumption, control energy distribution such as a relay function, monitor power quality, measure energy parameters such as phasor components, voltage or current, control energy generation facilities, compute revenue, control electrical power flow and load shedding, or combinations thereof. For functions which produce data or other results, the IED 105 may push the data onto the network 102 to another IED 105, data output device or back end server/database, automatically or event driven, or the IED 105 can wait for a polling communication which requests that the data be transmitted to the requestor.

For the purposes of the disclosed embodiments, a computer or computing device may be broadly defined as a device which comprises a processing unit and includes, but is not limited to, personal computers, terminals, network appliances, Personal Digital Assistants ("PDAs"), wired and wireless devices, tablet personal computers, game boxes, mainframes, as well as combinations thereof as are presently available or later developed.

The EEM software server 101 may be coupled with a utility 107, a generator 108, a substation 109, and an industrial facility 110 and so forth. The entities 107–110 may record and report various types of EEM data that is sent to the EEM software server 101 as set forth in greater detail below. In addition, as used herein, the entities 107–110 should be construed to include various types of computer workstations located at these types of facilities that may connect with and use the EEM software application that is located on the EEM software server 101. As such, as referred to herein, the devices 107–110 should be construed broadly to include various different types of computing devices that may transfer various types of energy consumption data to the EEM software server 101, as well as access the EEM software server 101 to use the EEM software application located thereon.

The EEM software server 101 may be coupled with one or more wireless devices 103. The wireless devices 103 may be IEDs, cellular telephones, or any other device that is capable of communicating wirelessly. The wireless devices 103 may transmit data to and/or receive data from EEM software server 101.

The EEM software server 101 may be coupled with one or more web browsers 104. The web browsers 104 may run on any computing device, and may access an EEM software application located on the EEM software server 101.

As illustrated in FIG. 1*a*, the EEM software server 101 may be coupled with a database server 111. The database server 111 may include a processor 112 that is programmed to interpret and process incoming data from any of the devices or entities that are coupled with the EEM software system 100. The database server 111 may include a database 113 that is designed to store various types of data that may be used by the EEM software system 100. The various types of devices or entities that are coupled with the EEM software system 100 may be designed to transfer EEM data to the database server 111, which may then be retrieved and used by the EEM software system 100. As such, as used herein, the database server 111 should be construed broadly as any type of device that is designed to receive and store data that may be used and accessed by the EEM software application, and as such may be part of EEM software server 101, or may be located on a separate device 111.

In some of the disclosed embodiments, EEM system components may share EEM data with one another. While one illustrative embodiment of the EEM software system 100 is depicted in FIG. 1*a*, it can be appreciated that an EEM system can be scaled out to include additional external data sources, or scaled down to include only internal data sources, such as only communications or data within a geographic location or area. EEM data may include, but is not necessarily limited to, Electrical Operation Data such as volts, amps, status, power; Power Quality Data such as harmonics, power factor, reliability (such as number of nines), disturbance data; Consumption Data such as energy and demand; Event Data such as set point actions, status changes and error messages; Financial Data such as energy cost, power factor penalties, revenue data, billing data such as tariffs for water, air, gas, electricity and steam; Environmental Data such as temperature, pressure, humidity and lightening/atmospheric disturbance data; Water Air Gas Electric Steam ("WAGES") data; Configuration data such as frameworks, firmware, software, calculations involving EEM Data and commands; and Aggregated data, where at least one energy management datum is combined with other data points. For the purposes of this application, combined data includes aggregated data and computed data.

Figure 1B:
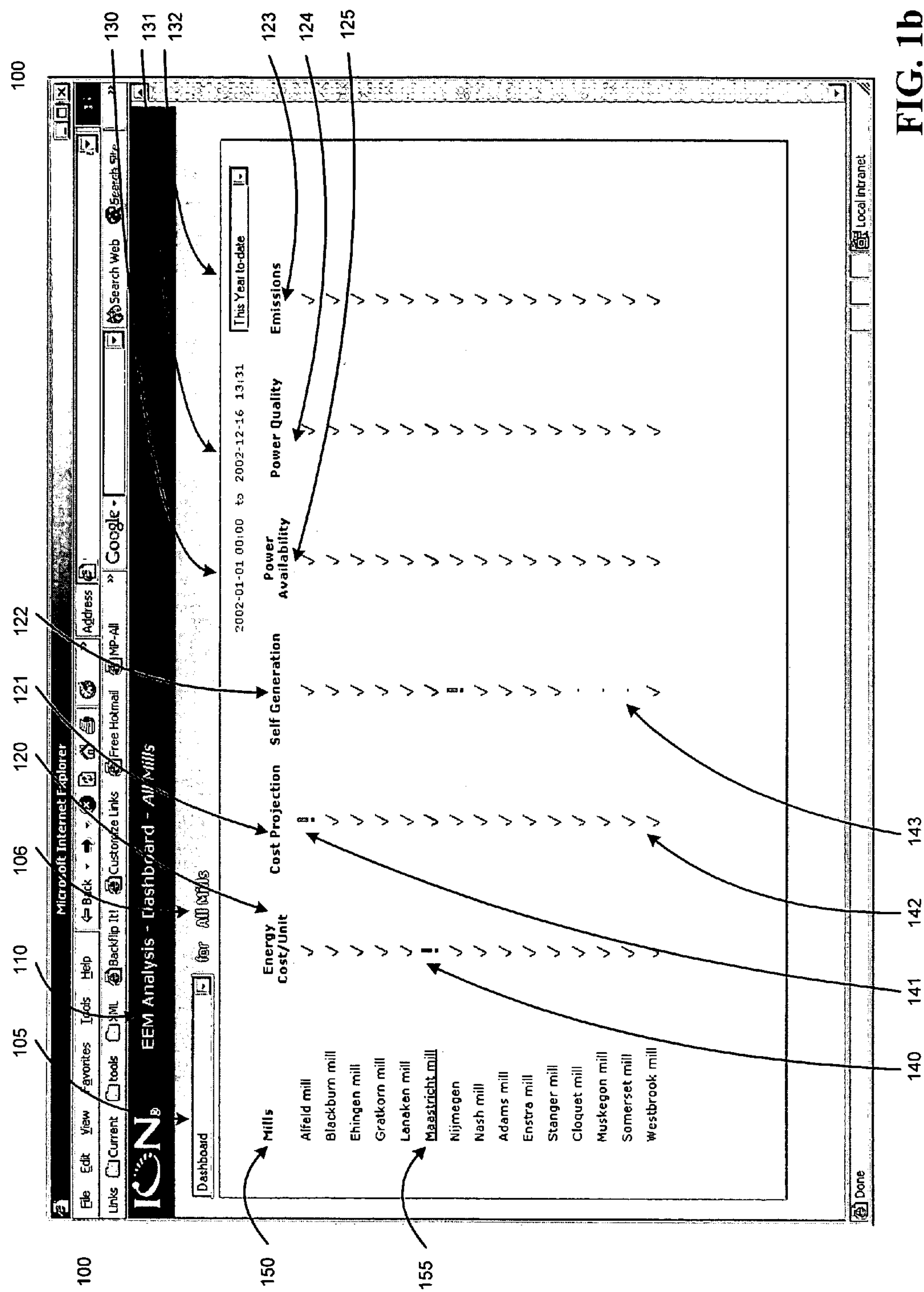
FIG. 1*b* depicts an exemplary EEM Analysis Graphical User Interface.

Referring now to FIG. 1*b*, a sample EEM Analysis screen, i.e. Graphical User Interface ("GUI") 115 is illustrated that may be generated by the EEM software application on the EEM software server 101. The EEM Analysis GUI 115 may depict EEM data in different formats, including both graphical and textual formats. A title bar 116 may be used to identify which EEM Analysis GUI 115 is depicted, providing a quick reference point for the user to establish context. An EEM Analysis selection field or control 117 allows the user to select what type of analysis they wish to create and view. In this example, a Dashboard option has been selected in the EEM Analysis control 117. The Dashboard may provide a single overview of the EEM software system 100, allowing a user to identify what is going on in the EEM software system 100 at a very high level. A description 118 (All Mills) may be provided to indicate what series or EEM system the EEM Analysis control 17 relates to. The description 118 could also be provided as a selection field, as will be discussed later.

The EEM Analysis GUI 115 may include a table 119 that sets forth various types of EEM data. The first column of the table 119 may set forth a plurality of operational units of interest 150, which could be departments, branches, physical locations, and so forth. Each row of the table 119 relates to a respective one of these operational units of interest 150, indicating the status of several categories or key performance indicators 120–125. The key performance indicators 120–125 can be energy cost/unit 120, cost projection 121, self generation 122, power availability 125, power quality 124, emissions 123, or other values based on the user needs and the set-up of the EEM software system 100.

For each operational unit of interest 150 and each key performance indicator 120–125, the EEM software system 100 may be configured with certain criteria indicating what is normal. Each cell in table 119 may have a symbol indicating the status of that key performance indicator 120–125 at that operational unit 150. In this example, normal performance may be indicated with a check mark, as illustrated at cell 142. Problem areas, for example where a set point or other operational guideline has been violated, may be indicated with an exclamation mark, as illustrated at cells 140, 141. When a certain key performance indicator 120–125 does not apply to an operational unit of interest 150, this may be marked with a dash, as illustrated at cell 143. It will be appreciated that various other symbols could be used to indicate these marks 140–143. Marks 140–143 allow a user to quickly identify which areas of interest are operating within the preset criteria and which areas are not. The marks 140–143 can be hyperlinked, allowing the user to click on them and drill down into other screens for further detail. In this way the user is able to analyze and manage their EEM system.

The operational unit 155 may be underlined, indicating that a hyperlink exists, allowing a user to click on the link and view a screen, possibly a web page, with performance indicators and other related data, such as weather, about operational unit 155. The time frame that the marks 140–143 are valid for is indicated at 130–132. The date-time selection field or control 132 may allow the user to select a date-time range they are interested in, such as the current day, this week, last week, last month, year to date, month to date and so forth. The exact date-time range currently being displayed is indicated at 130–131.

Referring now to FIG. 2, a Composite Analysis GUI 200 that may be generated by the EEM software application is illustrated. The title bar 116 indicates that the Compact Analysis GUI 200 is depicting a Composite Analysis. As such, the user has selected Composite Analysis in the EEM Analysis control 117 set forth in FIG. 1*b*. Composite Analysis breaks down loads and costs both qualitatively and quantitatively, classifying and ranking cost by usage type. This is essentially a dis-aggregation of the cost components of the aggregated totals. This allows the user to understand their loads and identify areas of high cost, to distinguish between controllable cost and fixed energy cost. By this means the user can focus their effort on what is alterable in their respective energy system and identify how much of their bill can be moved around to reduce their total cost.

A description 205 provides a brief summary on which data is included in a charting area 224, which in this example is the cost breakdown for the total corporation. A vertical axis 215 of the charting area 224 specifies percentages and a horizontal axis 235 specifies date-time range. The vertical axis 215 could display other units as well, such as kilowatt/hours ("kWhs"), and so forth. A legend 225 may be used to indicate the usage type categories depicted in the chart. The chart area 224 displays a stacked column 220–223, which indicates both what percentage each usage type category contributes to the total cost, and what the actual dollar figure of that cost is. Although this chart shows only one series, where additional series are selected, they may appear as stacked columns beside this one.

In this example, the energy cost 223 is contributing to over 60% of the total cost, at $4,678, whereas the fixed cost 220 contributes to under 10% of the total cost, at $548. It will be appreciated that although cost is the displayed measure, other measures such as load could also be used to size the chart elements. To see the data in a different format, the user could select a table view with a View Type control 240. Alternately, the user can select a different chart type such as a line graph with a Chart Type control 245. The View Type control 240 and the Chart Type control 245 are present in many of the EEM Analysis GUIs described below. As such, it should be recognized that various different types of graphical representations of EEM data might be displayed.

To adjust the date-time range depicted, the user can make various selections from a date-time selection control 230. The user can either select a custom start and end date-time, or choose a predefined date-time range. Wherever possible, time ranges are presented in an intuitive and easy-to-understand format such as last week, last month, last year and so forth. The user can also select the resolution they wish to view using the date-time selection control 230. The resolution could be something like day, week, month and so forth. The resolution can also be 'Recording Interval', which provides the highest resolution of the data. This series control is present in many of the EEM Analysis GUIs described below. If the user wishes to see a composite analysis of the last week broken down into days, they would select Day for the resolution, and Week for the range. The chart area 224 will now display seven stacked columns, one for each day. Any change in the date-time selection controls 230 is mirrored by a change of the date-time range axis 235. The user may select a Further Analysis selection 250 to gain access to an advanced tool such as an OLAP analysis tool (pivot tables or pivot charts) that shows the data already depicted in the charting area 224 and allows the user to add additional data for further analysis.

The user may be provided with great flexibility in what series are displayed in the charting area 224. A series can be a data source, representing various quantities such as operational unit, consumption for a company, process, machine, or a physical or logical grouping of several pieces of equipment and so forth. Examples of data sources are lighting, air-conditioning, production line, and so forth. All currently selected series appear in a series management control 270. Series that have a check mark beside them in the series management control 270 appear in the chart area 224, and those that do not have a check mark are 'hidden' from view. Additional series can be added to the series management control 270 using an Add New Series control 260. The Add New Series control 260 allows the user to select various measures, such as cost, consumption, demand, load breakdown and so forth, and to choose an operational unit that the measure applies to. The user can remove selected series from the series management control 270. The series management control 270 is present in many of the EEM Analysis GUIs described below.

A hierarchy control 280 allows the user to break down a series into selected groups. The selected groups can be broken down still further. In this example, if Lighting was selected, stacked columns 220–223 would each show a certain percentage (and cost) associated with Lighting. If Lighting is broken down still further in the hierarchy control 280, this change will be reflected in the charting area 224. The hierarchy control 280 may also be present in many of the EEM Analysis GUIs described below.

Figure 3:
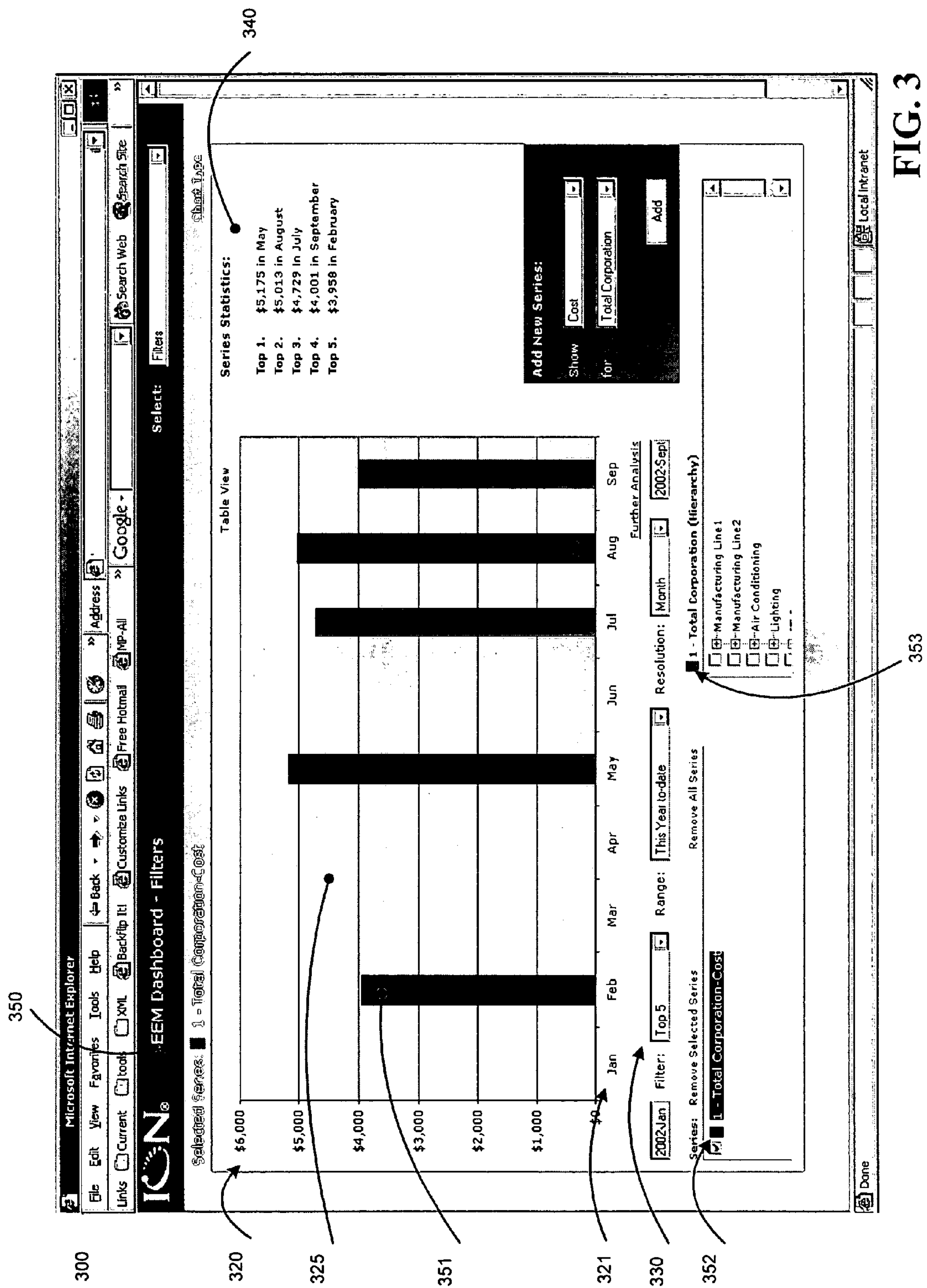
FIG. 3 depicts an exemplary EEM Filter Analysis Graphical User Interface.

Referring now to FIG. 3, the EEM software application may also be capable of generating a Filters Analysis GUI 300. The Filters EEM Analysis GUI 300 allows a user to prioritize their information or data points by filtering all the data to provide a subset. Possible filters include Top 1, Top 5, Top 10, Bottom 5, Highest, Lowest, Latest, Previous 3, Best, Worst, Largest, Smallest, Closest, Farthest and so forth. The user can use filters to identify what data needs further investigation. A filter control 330 allows the user to easily select the filters they are interested in using by selecting or entering predetermined data values. The Filters EEM Analysis GUI 300 provides other controls discussed previously, such as the date-time range control, the hierarchy control, the series management controls, and the EEM Analysis control.

In the example illustrated in FIG. 3, the horizontal axis 321 depicts a date-time range of Year-to-date, with a resolution of month, as selected in the date-time range control. The vertical axis 320 depicts a cost range $0–$6000. The Filter control 330 has 'Top 5' selected. A charting area 325 shows a bar chart with the Top 5 months based on cost. It will be appreciated that many other values as described previously can be selected from the various controls, and that the filtered data can also be presented in other ways, such as side-by-side bars with the dates indicated by labels on the bars.

A Series Statistics display 340 may provide information in natural language that is relevant to the results, typically as a numerical representation of the graphic. In this example the top five months are listed in order with their cost. The Series Statistics display 340 may appear in many of the EEM Analysis GUIs described below. Color coding may be used throughout the EEM Analysis GUIs to provide visual feedback to the user of what data series they are currently viewing. In this example, color cubes 350, 352, 353 are all the same color as bar 351 in the charting area 325.

Figure 4:
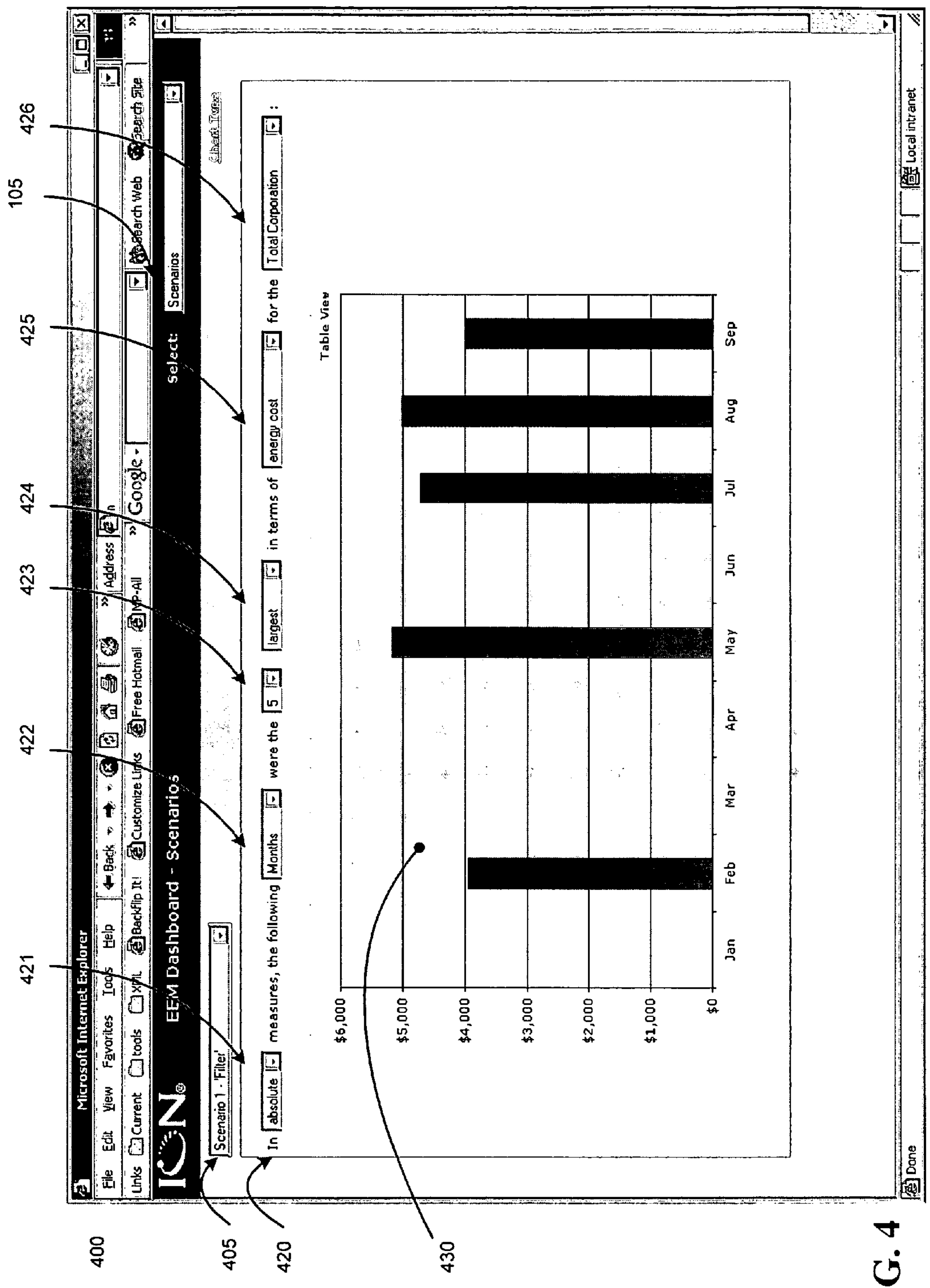
FIG. 4 depicts an exemplary EEM Scenario Analysis Graphical User Interface.

Referring now to FIG. 4, a Scenario EEM Analysis GUI 400 of the EEM software application as selected from the EEM Analysis control 117 is illustrated. Scenarios present a different way for the user to interact and view data that is available through other means in the EEM software system 100, by allowing a user to phrase an abstract query in simplified form, referred to as a natural language query, or English Language Query. Scenarios provide a simple way for the user to analyze, select, filter or abstract from a lot of information. Based on alternate scenarios, alternate natural language queries may be provided by the software. Scenarios provide choice to the user in how they describe their request, and bring the software into the human reality, rather than forcing the user to adapt to a software reality.

A Scenario Control 405 may allow the user to select what type of scenario they want to run. The scenario could be a filter, a 'what-if' query, a trend, comparison, statistics and so forth. A Query control 420 may provide an appropriate query structure to the user based on the Scenario Control 405 they have selected, simplifying the query building process by providing preset filters in intuitive forms. In this example, the user has selected a filter scenario in the Scenario Control 405. Accordingly, a filter query appears in the Query control 420. As noted above, based on alternate scenarios, alternate queries may be presented to the user. The user may compose a sentence from drop down menus 421–426 or other selectable menu types. The illustrated query is simply one sample query that the user could construct. The charting area 430 depicts a filter chart based on the query entered by the user in the drop down menus 421–426. It should be appreciated that although the Query control 420 depicts an English Language Query, that the Query control 420 could be implemented in various other formats and in other languages. A chart roll-up (not shown) and chart display type (not shown) also gives the user increased ability to display the query result in desired form. For example the chart roll-up may compress the data into time periods of a recorded interval, hour, shift, day, week, month, quarter or year, while the chart display type allows the user to choose between bar graphs, line graphs or tables.

In operation, a filter scenario may give the user the query control 420 of "In (term) 421 measures, the following (time) 422 were the (value) 424 (scale) 424 in terms of energy (use) 425 for the (location) 426, where the (term) selection includes absolute and relative, the (time) selection includes specified time interval, hour, shift, week, month, quarter or year, the (value) selection includes values from 1 to 100, the (scale) selection includes largest or smallest, the (use) selection includes energy cost, energy use, demand penalties and deviation from norm, and the (location) selection includes total corporation, specific location, specific load, specific production line, air conditioning, lighting systems and IT systems. It can be appreciated that other values can be utilized in the selectable query menus.

In an alternate embodiment a scenario may filter in only energy costs, allowing a user to interactively create a natural language query that answers the question "What is my energy cost?" in the form of "Show me the (cost) for (area) for (time)", where the (cost) selections include Total energy cost, electric energy cost, gas energy cost, total energy consumption, electric energy consumption and electric demand, and (area) selections include Entire corporation, office groups, specific offices, tenant groups, specific tenants, and (time) selections include today, yesterday, this month, this quarter, last month, last quarter, last year. Alternate query questions include "Compare (x) to (y) for (area) for (time)", "Show me (energy type) related to (consumption type)" and Compare (tariff structure A) against (tariff structure B) for (area) for (time)". Again it can be appreciated that other query and associated selections can be created for and by a user.

Figure 5:
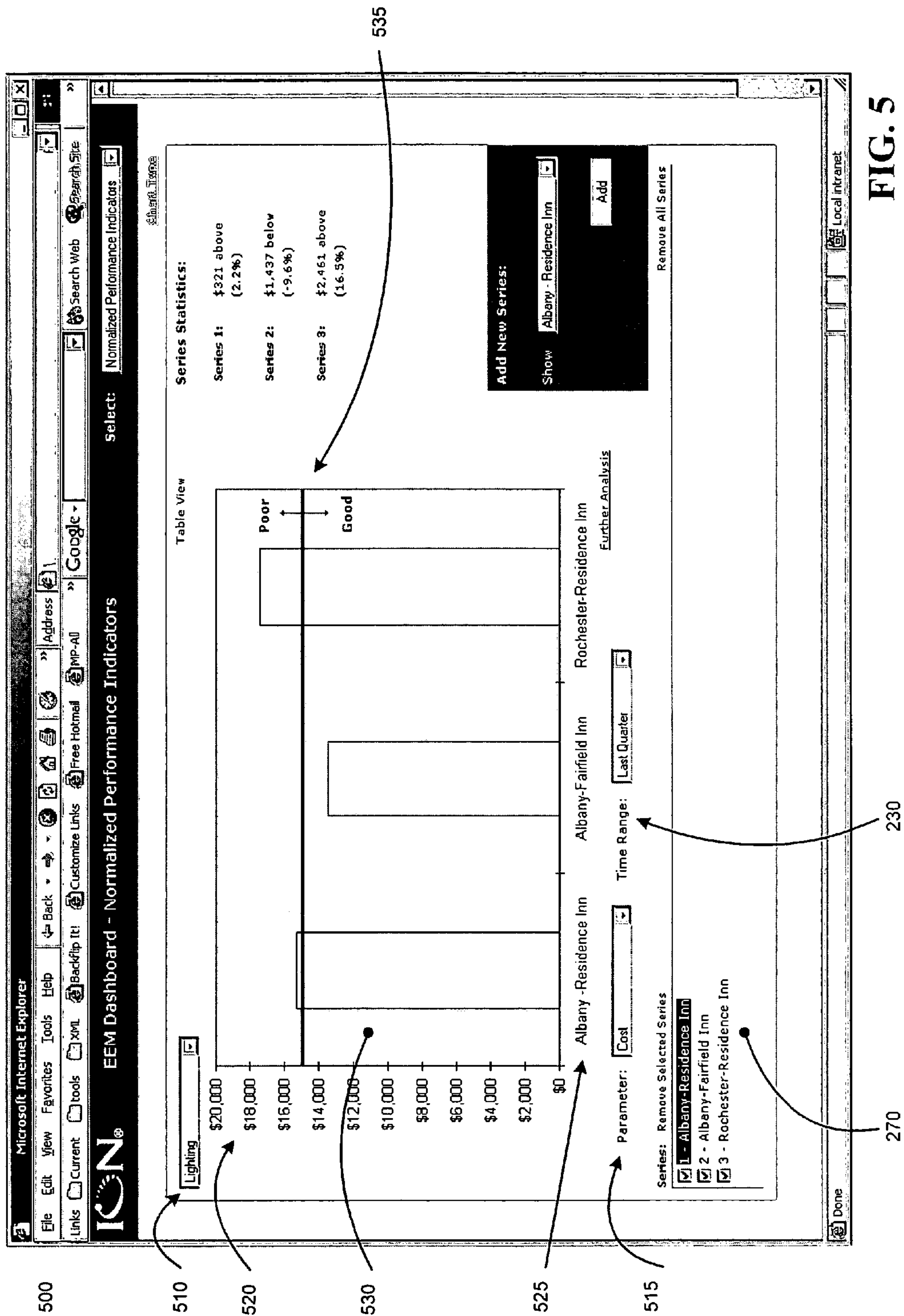
FIG. 5 depicts an exemplary EEM Normalized Performance Analysis Graphical User Interface.

Referring now to FIG. 5, the EEM software application may also generate a Normalized Performance Indicators EEM Analysis GUI 500. Normalized performance indicators allow a user to set up benchmarks, targets or thresholds. Parameters may be normalized using various normalization techniques as appropriate for the quantities in question. The purpose of the Normalized Performance Indicators EEM Analysis GUI 500 is to compare measures from different operational units, for example hotels in a hotel chain to each other and to a pre-set base-line. The base-line could be an average, a projection, "last year" or any other benchmark. The user may select the operational units as series, the data sources within these operational units and the measures they want to compare.

A data control 510 allows the user to select the data source and a parameter control 515 determines the measures that are going to be displayed in a charting area 530. Both the data sources and the measures must be common to all series (operational units) for this analysis to work. A date-time selector control 230 and a series management control 270 allow the user to select over what date-time range and which series they want to compare measures for. The horizontal axis 525 may display the selected series and the vertical axis 520 may enumerate the measure. A line 535 may be used to indicate the benchmark or target. Depending on whether a series falls above or below the line 535 indicates whether the series has met its target or benchmark.

Referring now to FIG. 6, the EEM software application may also generate a Specific Ratios EEM Analysis GUI 540. Specific ratios allow for normalizing, benchmarking, and comparing the relative values between two different data sets. Specific ratios allow the user to eliminate variables to provide a fair comparison between series. For example, a hotel chain might factor out weather or occupancy. Specific ratios may indicate areas where things are not as they should be.

A driver is a quantity that influences other quantities; it provides a comparison or baseline that can be used for normalization. A driver for a hotel chain can be occupancy, whereas a driver for a manufacturing company can be production volume. A Driver control 545 allows the user to select a driver for the specific ratio. A charting area 563 depicts the specific ratio. The horizontal axis 555 may depict a date-time range. The vertical axis 560 may depict the driver, in this example as a percentage, and a second vertical axis 565 may depict the normalized quantity.

In this example, the driver (occupancy) is charted against month in columns 551, and the normalized quantity (consumption) is charted against month in a line 550. The specific ratio indicates that while occupancy decreased in September, relative energy consumption increased. The Series Statistics 340 show July as a baseline, with the driver and normalized quantity compared as a percentage change to the baseline. In another example, a manufacturing facility may decide to run a transformer hot, which reduces the lifespan, but is more cost effective than load shedding or bringing in a new service. The key point is that the user of the EEM software system 100 can compare options and make the best decision for their situation.

Referring now to FIG. 7, the EEM software application may generate a Comparisons EEM Analysis GUI 570. The Comparisons EEM Analysis GUI 570 allows the user to compare past and present points in time over various data sources for a parameter control 515. The parameter control 515 can be any measured quantity like cost, energy, peak demand, temperature, flow and so forth.

A resolution control 572 may be used to set the resolution of the comparison over a period of time. A comparison can also be made between current values and 'what-if' analyses. Comparisons can be used to track predictions against actual real use. When the actual values fall below the forecasted values, the EEM software system 100 can automatically run a report or display an alert. The Comparison Analysis GUI 570 can be linked with the Composite Analysis GUI 200 discussed previously to do a 'why' analysis, for example, what contributed to a peak or transient, or why was demand higher than projected. This provides the ability to drill down and answer user questions.

In this example, a charting area 592 depicts the cost for the same corporation, for this year and last year, broken down on a monthly basis. The two series 590, 591 may be color coded allowing for easy differentiation from each other. A Selector control 580 may indicate which series is currently selected by the user. Details about that series may appear in the Series Statistics display 340. A Cursor control 595 may allow the user to place the cursor on a spot in the charting area 592 and receive details about that particular point. In the Comparison EEM Analysis GUI 570 illustrated in FIG. 7, cursor details may appear in the Series Statistics display 340, but they could appear in a pop-up window, beside the cursor and so forth.

Referring now to FIG. 8, the EEM software application on the EEM server 101 may also generate a Lines of Best Fit EEM Analysis GUI 600. The Lines of Best Fit EEM Analysis GUI 600 may use regression analysis to identify relationships in the underlying data. These relationships can be of a linear or non-linear nature. Once a pattern has been identified, it can be compared to other known patterns for similarities. If it matches a pattern with known characteristics, then it is reasonable to assume that the relationships under study also have those characteristics. Also, certain relationships are amenable to further analysis as outlined below. Different types of curves show patterns in relationships or indicate various events are occurring in the EEM software system 100. Lines of Best Fit are related to Cumulative Sum of Deviation from Baseline ("CUSUM") curves that will be described in greater detail below.

Once the relationships are identified, baseline calculations and forecasting can be performed. Also, simulations and 'what-if' scenarios can be run to exploit the relationships between the variables to help determine ways to improve a respective energy system. In particular, a simulation model of the EEM software system 100 can be built based on historical data collected over a longer period of time. Artificial intelligence and self-learning can be incorporated as part of the simulation. The simulation can be used as an economic planning tool, or to do automatic Return On Investment ("ROI") analysis, for example tying in energy data with economic data such as energy rates to predict and plan projects by doing ROI on actual and future predicted costs.

In this example, a consumption measure 601 has been graphed against a driver 602, which in this example is Heating Degree Days. Data points 605 represent monthly consumption aggregates, as chosen from the date-time resolution control 615, graphed against Heating Degree Days. Line 610 has been extrapolated using linear regression analysis to give an indication of the trend of the data. In this example, the amount of kWh used increases as the Heating Degree Days parameter increases. A Range Control 615 allows the user to choose the range over which they want to see data. The range will vary depending on what the driver is and what units make sense for that driver. In this example, Custom Range has been selected, with values 0–200 automatically selected by the EEM software application to represent Heating Degree Days.

Figure 9:
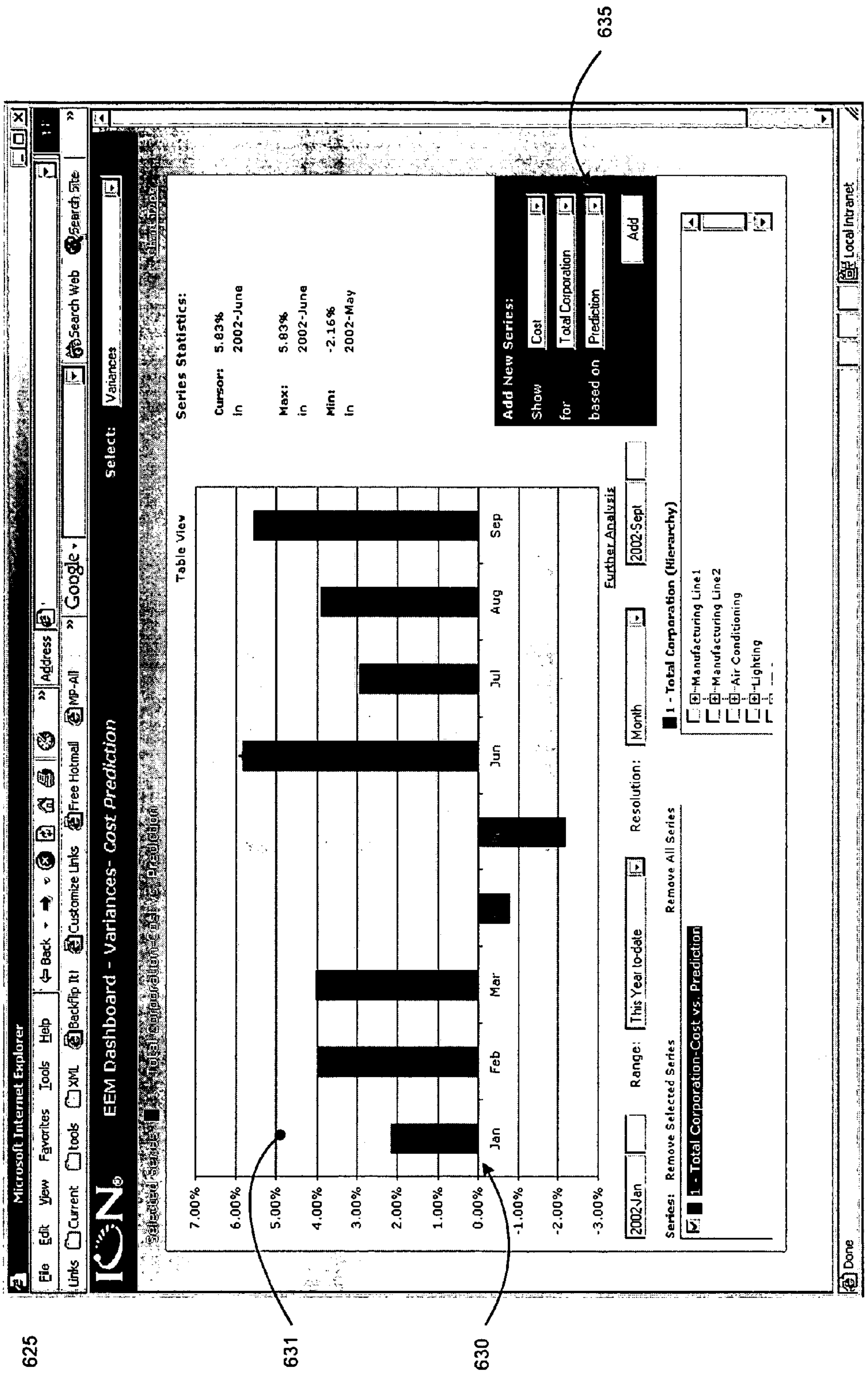
FIG. 9 depicts an exemplary EEM Variance Analysis Graphical User Interface.

Referring now to FIG. 9, the EEM software application may also generate a Variances EEM Analysis GUI 625. The Variances EEM Analysis GUI 625 illustrates the difference between two variables after time, possibly compared to a baseline or prediction. This allows the user to identify differences, improvements, and changes over time, perhaps to verify performance. Variances can be used in conjunction with Lines of Best Fit shown in FIG. 8 to see how a prediction panned out. For example, the ROI analysis discussed above can be verified here. Variances can also be used in conjunction with cumulative sums of variance to allow users to detect very small trends, measure their cumulative effect, and take action to enhance or inhibit the trend as desired. Variances can be linked to a notification system that alarms or otherwise notifies when a variance exceeds a preset limit.

A reference control 635 allows the user to select a reference to chart variance against. This reference can be a prediction, a baseline, a target, or some other value. In this example, variance in cost based on the reference prediction is shown. A baseline 630 indicates the reference prediction and a charting area 631 shows the deviation from this cost prediction over the selected time range. In some cases, the cost exceeded the prediction, and in some cases the cost was less than predicted.

Figure 10:
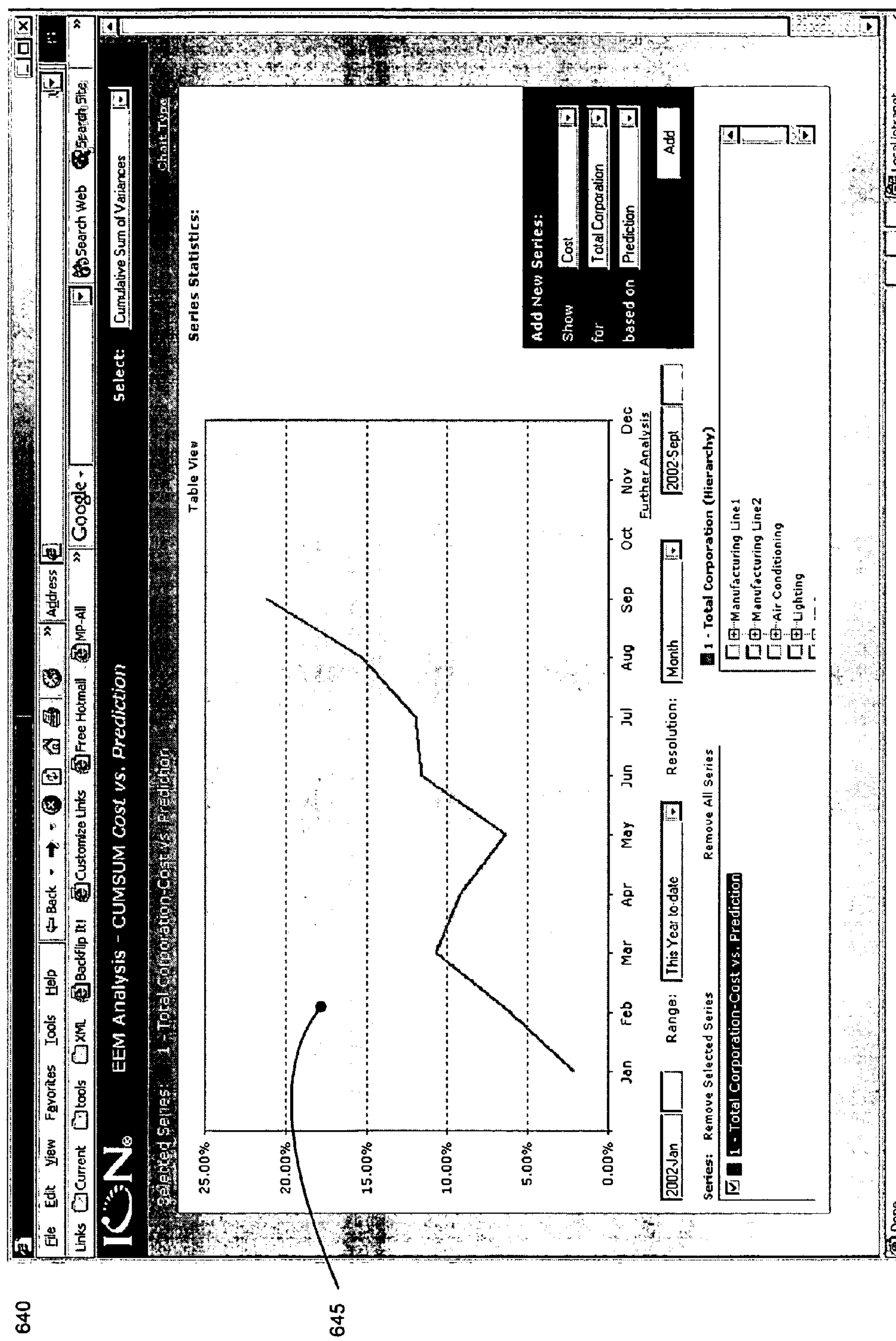
FIG. 10 depicts an exemplary EEM CUSUM Analysis Graphical User Interface.

Referring now to FIG. 10, the EEM software application may also generate a CUSUM EEM Analysis GUI 640. CUSUM curves excel at detecting small changes in a trend or differences in two or more trends over time. The slope of a CUSUM curve indicates the magnitude of the variance and inflexion points indicate some change has occurred in the underlying trend. Inflexion points can be drilled down on to further analyze and identify what happened at that point to cause the change. CUSUM curves can be used to identify loads or combinations of factors that led to a load. Event information can be superimposed over a chart to see where changes tie in with events.

Lines of Best Fit (FIG. 8), Variances (FIG. 9) and CUSUM curves (FIG. 10–12) can be combined to provide a logical analysis for the user to step through. The Lines of Best Fit allow predictions to be made, the Variances allow the user to compare predictions to what actually happened, and the CUSUM curve shows the trend of the Variances over some time frame. In this example, a consistent slope in the CUSUM curve can show the quantified benefit (possibly financial) of changes made in a facilities energy system management or control. The graph depicted in charting area 645 of FIG. 10 shows the same data as that in charting area 631 of FIG. 9, with the difference that the CUSUM curve is showing a running total rather than the discrete values.

Figure 11:
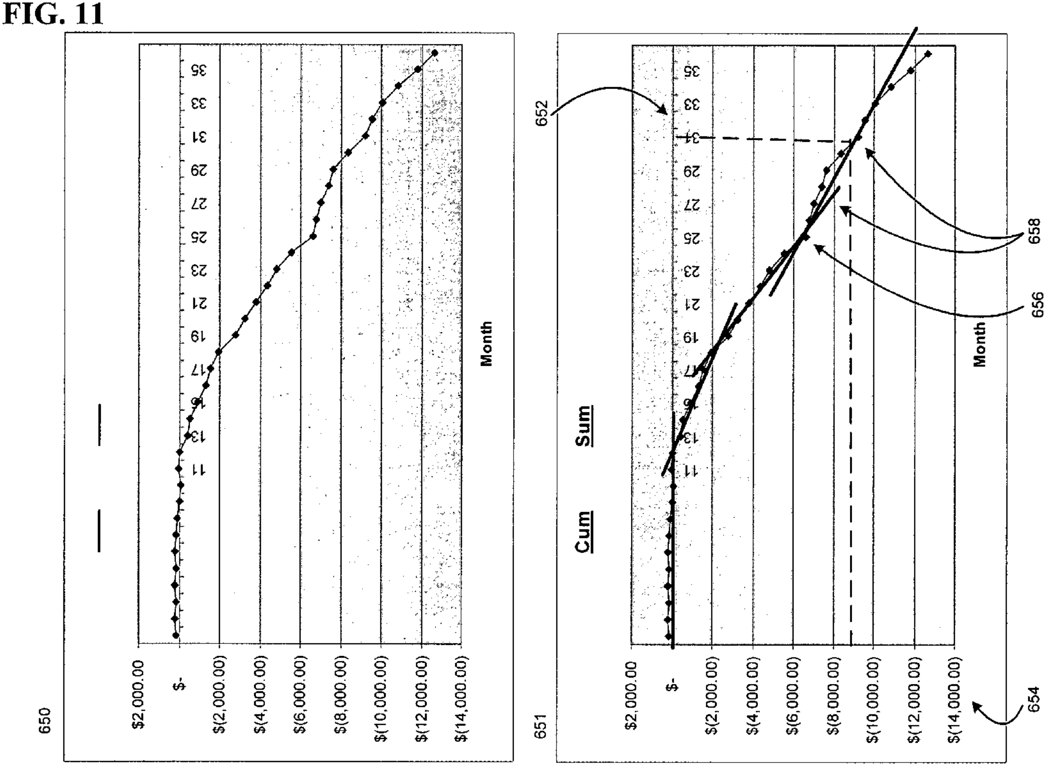
FIG. 11 depicts a second exemplary EEM CUSUM Analysis Graphical User Interface.

Referring now to FIG. 11, EEM Analysis screen 650 depicts a typical CUSUM curve. EEM Analysis screen 651 depicts the same CUSUM curve with automatically generated analysis performed on it by the EEM software application. Trend lines 658 have been automatically generated. Inflexion point 656 indicates where something changed in the system. In this example, the vertical axis 654 is enumerated by cost, but it could be energy, kWh, or some other unit. The horizontal axis 652 is enumerated by days, but it could also be some other time range or period. The user can quickly see how much money they have saved, could have saved, or may save in the future. In this example, the user could have saved $9,000.00 in 31 days, and so forth.

Figure 12:
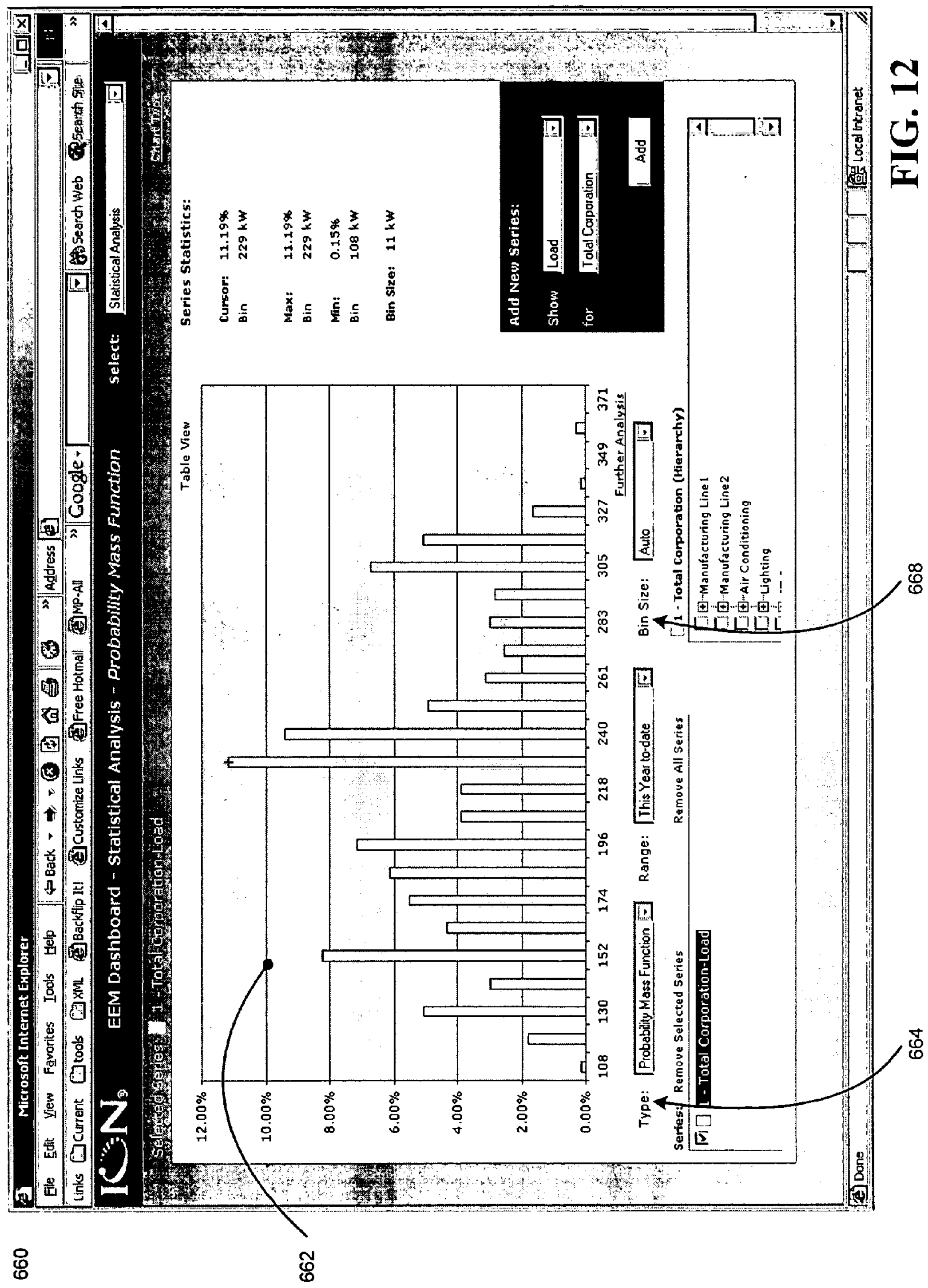
FIG. 12 depicts an exemplary EEM Statistical Analysis Graphical User Interface.

Referring now to FIG. 12, the EEM software application may also generate a Statistical EEM Analysis GUI 660. The Statistical EEM Analysis GUI 660 allows the user to view data using some statistical means well known in the art. These analyses can be used to identify and analyze patterns and changes over time, to profile, normalize, compare and assess performance of an operational unit and so forth. A Statistical Type control 664 allows the user to select the specific statistical analysis type they want to use. A Bin Size control 668 allows the user to control the resolution of the data points. Possible values for the bin size are context sensitive, but could include a number such as 10 or 20, or auto, indicating that the EEM software application can choose a bin size that makes sense in this example.

In this example, a charting area 662 depicts a probability mass function as was selected in the Statistical Type control 664. The probability mass function breaks down the load into ranges or bins, to show the distribution of load levels over time. For example, the load was in the 229 kW bin 11.19% of the time. This allows the user to identify loads to remove that will save money. The EEM software application can automatically color loads that need to be addressed. This could be linked to other information such as cost or load inventory and 'what if' simulations could be run against the data to optimize or propose improvements. An industry, operational unit, or load specific profile could be provided by the underlying system to be used for benchmarking and comparison.

Figure 13:
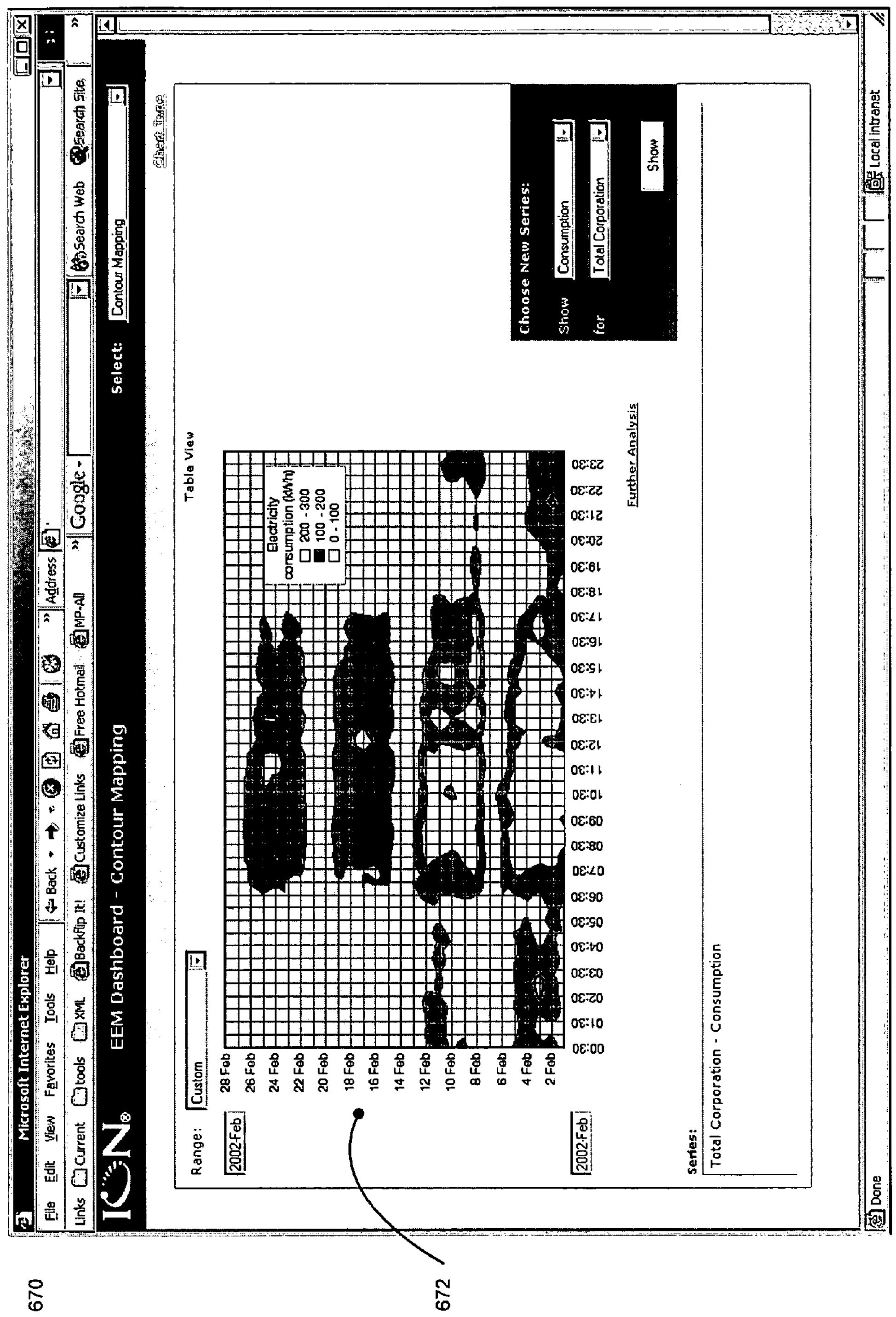
FIG. 13 depicts an exemplary EEM Contour Mapping Analysis Graphical User Interface.

Referring now to FIG. 13, the EEM software application may also be capable of generating a Contour Mapping EEM Analysis GUI 670. The Contour Mapping EEM Analysis GUI 670 may allow the user to analyze energy data over time in a simplified, graphical, colored format. The user can identify recurring patterns and overlay rate information to see cost saving opportunities. In this example, charting area 672 shows consumption graphed with respect to time. This allows the user to isolate times with high consumption costs. Any measure can be graphed, such as occupancy, weather related data and so forth.

Figure 14:
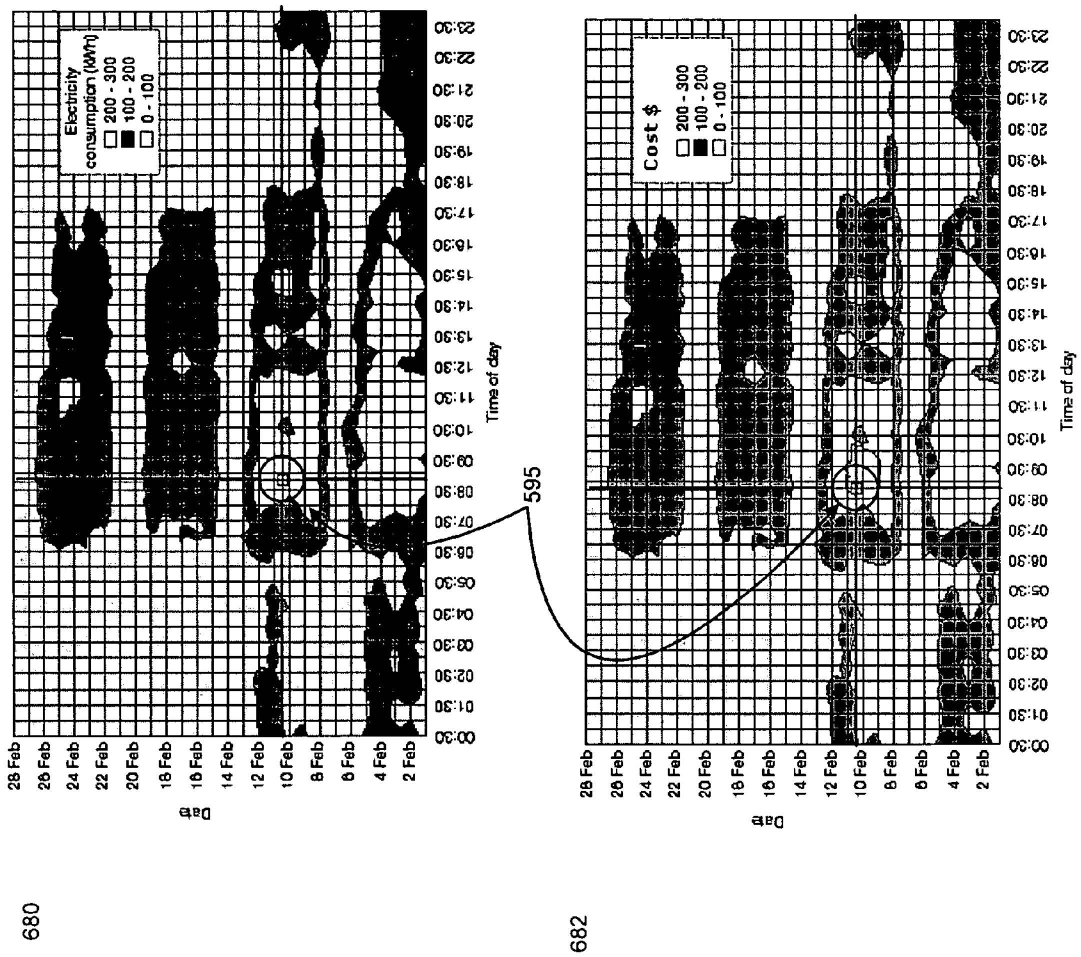
FIG. 14 depicts a second exemplary EEM Contour Mapping Analysis Graphical User Interface.

Referring now to FIG. 14, a number of charts 680, 681 can be displayed at the same time linked with a common cursor control 595. It will be appreciated that although only two charts are depicted here, multiple charts can be depicted on the same screen sharing a common cursor control 595. The charts 680, 681 can display any measure such as consumption, cost, weather and so forth over a common dimension such as date-time. A single cursor can be moved simultaneously across all charts, allowing the user to easily correlate measures across dimensions. This provides a powerful means to analyze multi-dimensional information and is particularly useful when analyzing contour maps.

In this example, energy consumption and cost at certain times of the day over a period of several days are linked. The contour map can be presented using a gradual change in color rather than an abrupt change based on bin size. The coloring can be based on fuzzy inference. The underlying software may automatically select the most meaningful contours for users, rather than arbitrary contours that may not have much value.

Figure 15:
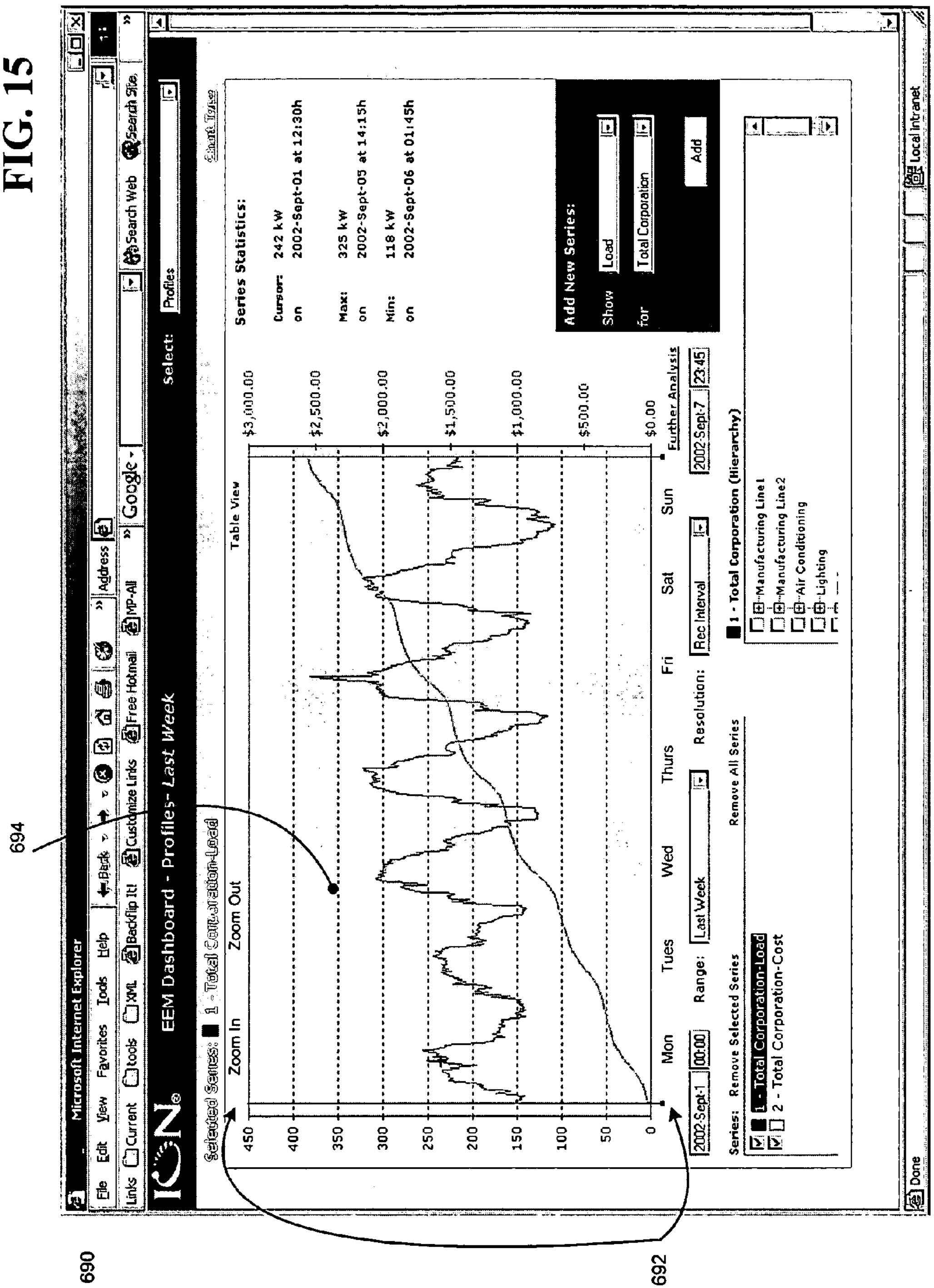
FIG. 15 depicts an exemplary EEM Profiles Analysis Graphical User Interface.

Referring now to FIG. 15, the EEM software application may generate a Profiles EEM Analysis GUI 690. The Profiles EEM Analysis GUI 690 allows the user to correlate and compare the behavior of two quantities over time to see if a relation exists between the two. This allows the user to identify and detect anomalies, driving factors, or exogenous factors. In this example, in charting area 694, both load and cost are both charted against time. Zoom controls 692 allow the user to zoom in to see further detail, or out to see the big picture.

Figure 16A:
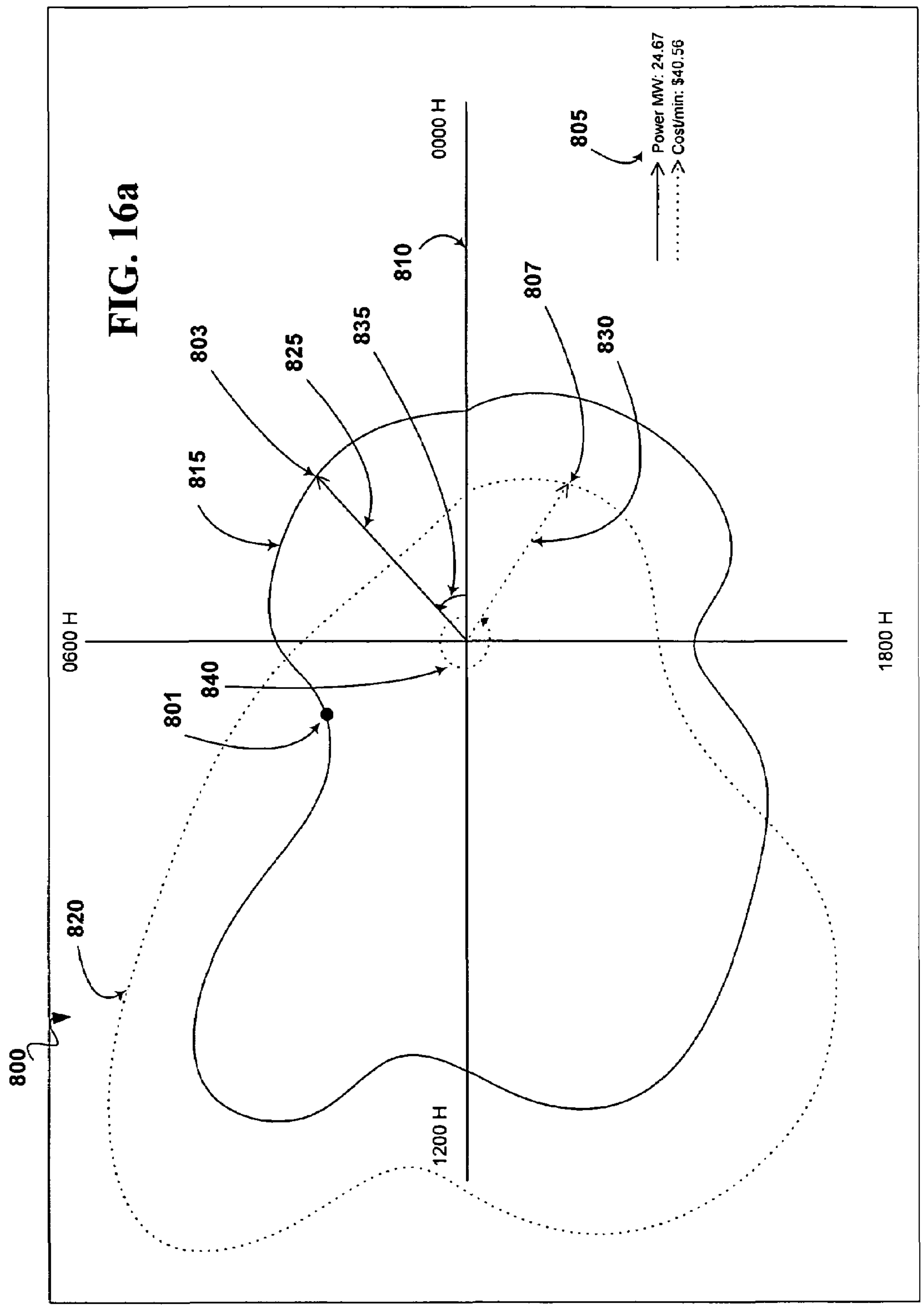
FIG. 16*a* depicts an exemplary EEM Polar Analysis Graphical User Interface.

Referring now to FIG. 16*a*, an EEM polar analysis plotting GUI 800 that may be generated by the EEM software application is illustrated. The EEM polar analysis plotting GUI 800 may include a graph in circular or polar coordinate form. The EEM polar analysis plotting GUI 800 includes a power line 815. At any point on the power line 815, a vector 825 can be drawn from the origin of the to this point (e.g. point 803). The length of the vector 825 is indicative of the amount of power being generated/consumed and the angle 835 between the vector 825 and axis 810 is indicative of the time of day that the power was being generated/consumed. During operation, a user may move the vector 825 to any point on the plot 800 and receive EEM data about that particular time period.

The plot 800 may also include a cost line 820. At any point on the cost line 820, a cost vector 830 can be drawn from the origin of the graph to this point (e.g. point 807.) The length of the cost vector 830 is indicative of the cost of the power being generated/consumed and the angle 840 between the vector and axis 810 is indicative of the time of day that the power was being generated/consumed. It will be appreciated that the vector 825 and the cost vector 830 may be linked such that they move in unison and indicate the amount of power and cost at any time. A text display 805 may be provided to show the value that the length of each vector currently represents.

Although shown on plot 800 as one day, it will be appreciated that the time period for the plot 800 could encompass different periods of time, for example a standard (for the user) shift, a 12 or 24 hour day, a week, a month, as year and so forth. The cost may be calculated through a formula that represents a tariff scheme and may include a typical utility contract or real time pricing.

The plot 800 allows for detection of anomalies that can be detected either by the user or through software algorithms. As an example, an anomaly 801 may be indicated due to the fact that energy usage around 7:00 AM on the day depicted in this figure was less than expected as it is less than that at 6:00 AM and for the particular installation, power usage is expected to increase over this time period. The different lines on the plot 800 will typically be displayed in different colors such that a user can more easily interpret what is being displayed. Data analysis (OLAP, cubes, etc.) can be used to overlay Mondays over other days, etc. An intensity of color may indicate the statistical mean and variance of a value.

It will be appreciated that power and cost are only two of things that can be displayed on the plot 800. Other display features may include, but are not limited to formulae such as percentage of expenditure, selection based on unsupervised learning (may include some neural classification) that finds boundaries as a suggested starting point, percentile, divergence or some other way of selecting contours based on a measure of entropy (how much information) that is contained within the contour. This may be based on a logarithm of a percentile. This may result in contours that matter to the user.

In an alternate embodiment, another plot depicting "normal" or nominal system behavior is overlaid the actual plot 800. By comparing the nominal plot with the actual plot, abnormal behavior can be detected and investigated. The incremental area of the region between the plot lines as swept by the time pointer can be used as a monitoring value to detect changes in real time. It will also be appreciated that the various controls previously described can be applied to this EEM Analysis method as well.

Figure 16B:
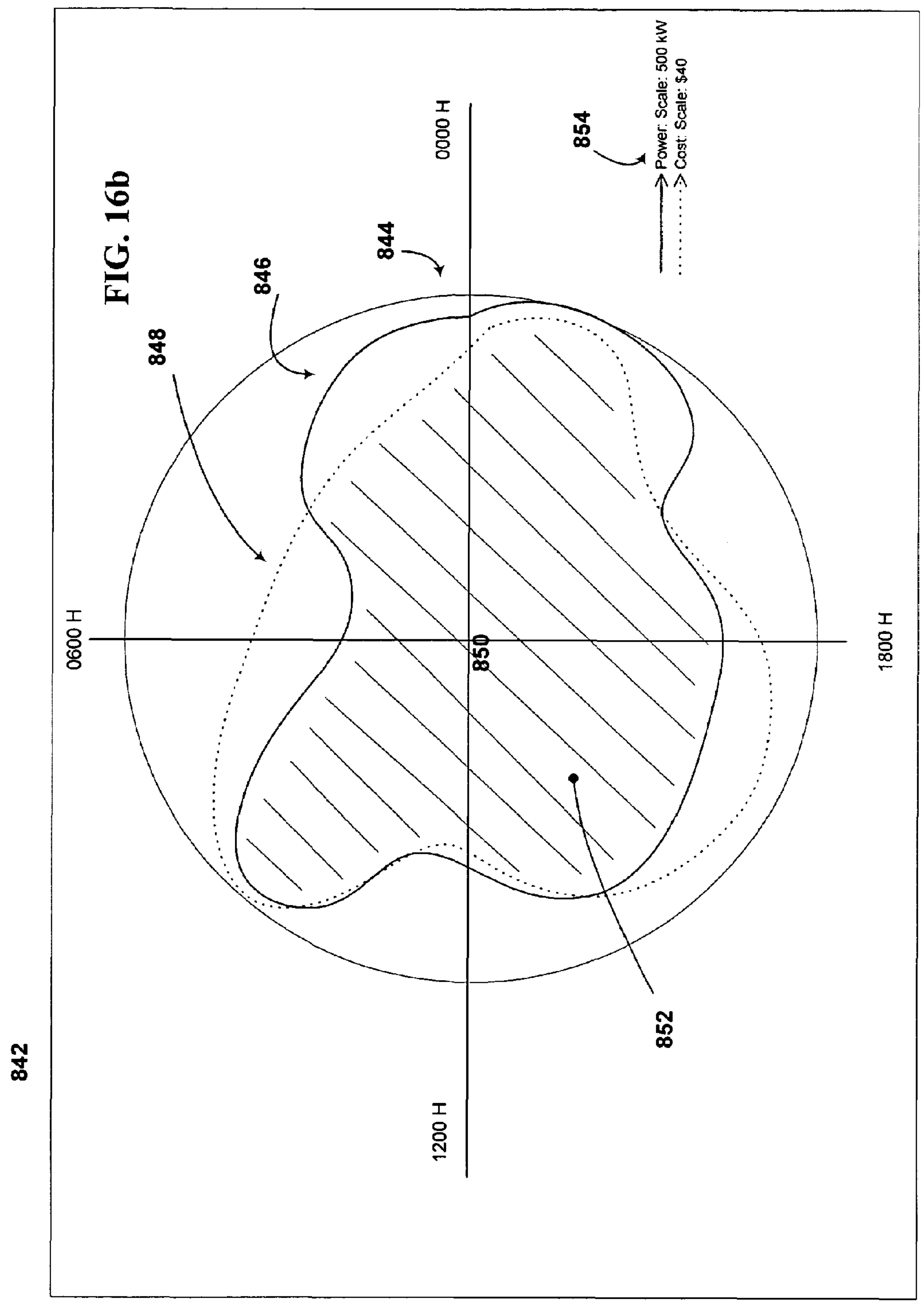
FIG. 16*b* depicts a second exemplary EEM Polar Analysis Graphical User Interface.

Referring now to FIG. 16*b*, a normalized plot 842 similar to the plot depicted in FIG. 16*a* is illustrated. In this case, however, the two quantities 846, 848 depicted in the plot 842 have been normalized to a range between 1 and 0. A circle 844 represents the unit 1, and the center point 850 represents the unit 0. A text display 854 may be provided to show the scale of the two quantities. In this example, power and cost have been normalized, and now an overlapping area 852 of both curves can be used as a measure for total cost. The EEM software application could use various optimization algorithms to calculate scenarios with the least amount of overlap area which would be equivalent to the lowest overall cost for a given power profile or energy need.

Figure 16C:
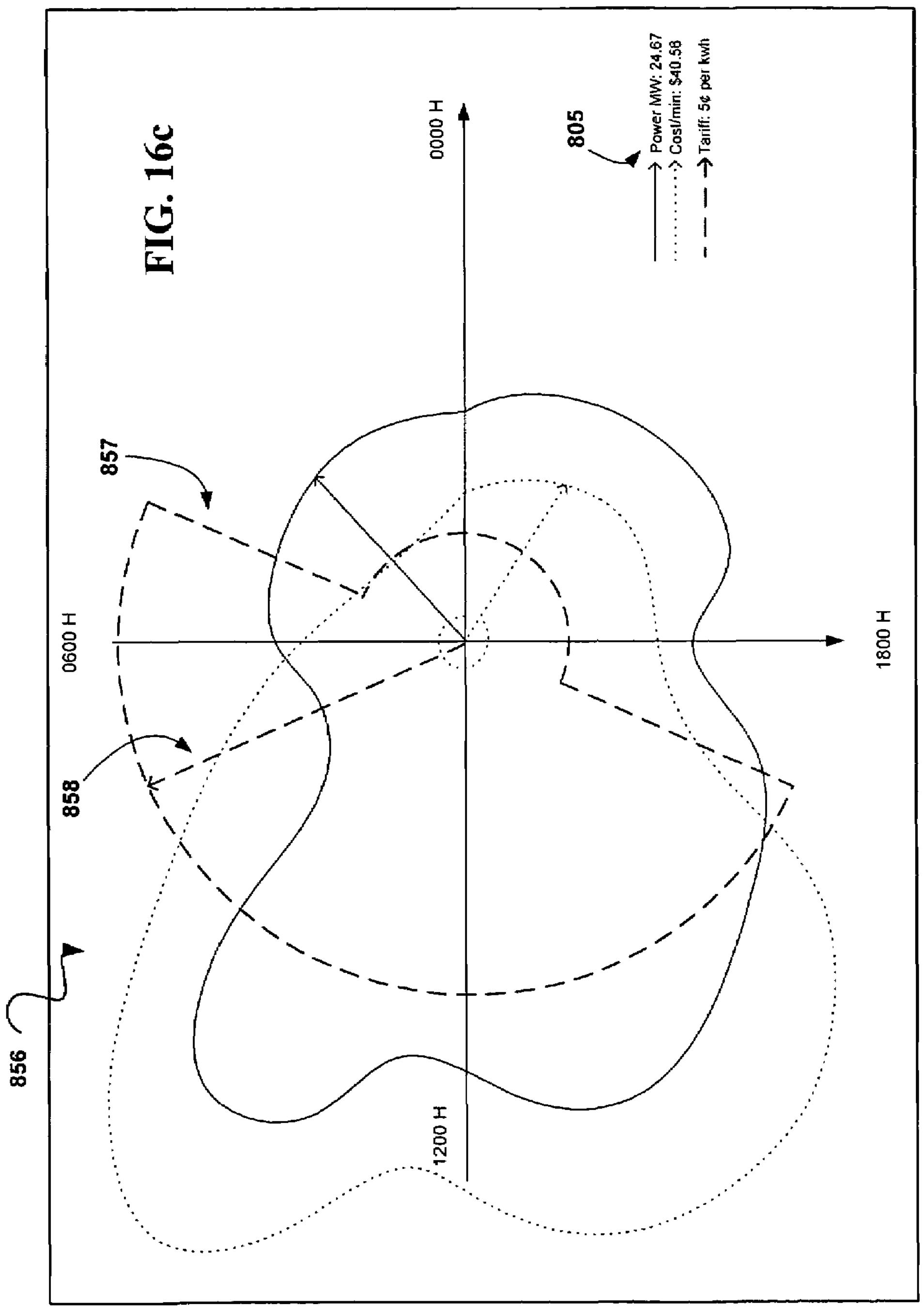
FIG. 16*c* depicts a third exemplary EEM Polar Analysis Graphical User Interface.

Referring now to FIG. 16*c*, an EEM polar analysis plotting GUI 856 that may be generated by the EEM software application is illustrated. The EEM polar analysis plotting GUI 856 is similar to plot 800 of FIG. 16*a*, but has an additional tariff line 857 that is indicative of the tariff structure over time. At any point on the tariff line 857, a vector 858 can be drawn from the origin to the line 857. The length of the vector 858 is indicative of the cost of energy, which is useful for identifying at what times energy costs more, and when it is cheaper. The angle between the vector 857 and axis 810 is indicative of the time of day that the tariff applies to. During operation, a user may move the vector 858 to any point on the plot 856 and receive EEM data about that particular time period in the text display 805. When tariff line 857 is shown on the same polar analysis plotting GUI 856 with power line 815 or cost line 820, cost data can easily be related to actual usage.

Figure 17:
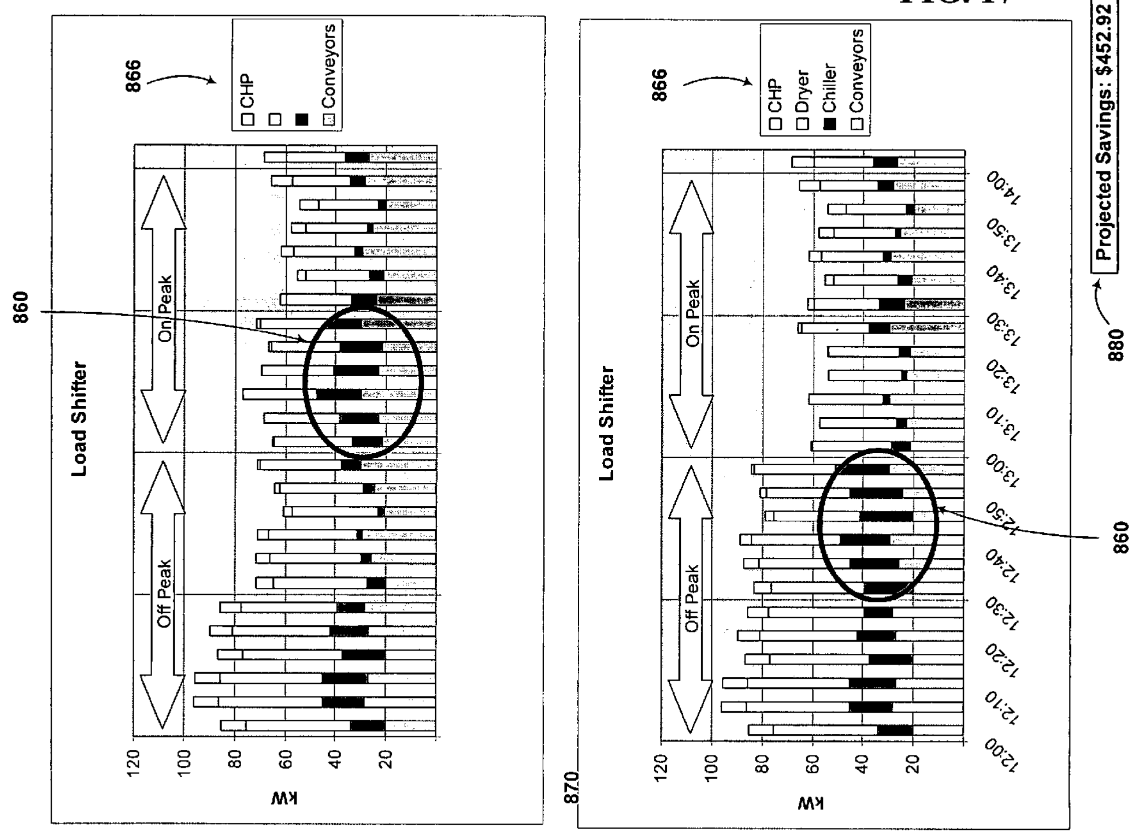
FIG. 17 depicts an exemplary EEM What-if Analysis Graphical User Interface.

The EEM software application also allows the user to graphically perform "what-if" analysis by shifting the time that various loads 866 are operated from one time period to another. Referring now to FIG. 17, an example Load Shifting GUI 865 is illustrated that is capable of allowing users to switch the time that various loads 866 are operated from one time period to another. In the Load Shifting GUI 865, the user is able to see if their energy usage during on and off peak periods is unbalanced. Utilities generally charge a premium based on the peak energy usage within periods. Therefore, it is advantageous to use as close to a constant amount of power during these periods as possible. One energy cost management task is to determine what would happen if a load or process were operated at another point in time. The user wants to see the results in terms of cost differential and how it fits into their tariff or contract with the utility. The EEM software application on the EEM software server 101 allows the user to perform what-if analysis by selecting and shifting energy usage based on a list of known loads and the time the corresponding energy was used.

The Load Shifting GUI 865 shows the energy usage before a modification is made. Several different types of loads 866 may be displayed in the graphs, which will depend on the type of power consuming devices that are being used at any given business or entity at any given period of time. In our present example, the chiller is illustrated as being operated in the 13:00 to 13:30 time period and is shown on the first graph by highlight 860. The user may then drag this highlighted section to the left to simulate the same situation if the chiller was operated in the 12:30 to 13:00 time period as shown in the second Load Shifter GUI 870. The user can then see that their peak usage during both time periods is more even. The EEM software application may also indicate a projected savings 880 (based on the tariffs in effect) of making the change.

The concept is to break down energy use by end-user load into a stacked bar graph over time. The user can then see which loads 866 were using how much energy, the time at which the energy was used, and the load shape. Based on this information, and knowledge of the tariff structure (which may be shown on an adjacent graph), the user selects one or more load/time blocks and drags them to a new time period. The EEM software application located on the EEM application server 101 then recalculates the energy usage and cost and displays the difference to the user.

The load shifter can be tied in with the multiple cursor linked charts described in FIG. 14, thereby allowing the user to easily see how shifting a load in one area will affect other measures such as cost. Load shifting can also be performed automatically by the EEM software application. Predefined constraints may be configured in the EEM software application that will move loads around to minimize cost and optimize performance. Once the optimal load schedule has been determined, the EEM software application could publish to a control device of the load 866 for automatic implementation. As used herein, publishing to the control devices of the loads 866 should be construed to including programming to operate the load 866 during a predefined optimal time period.

Figure 18:
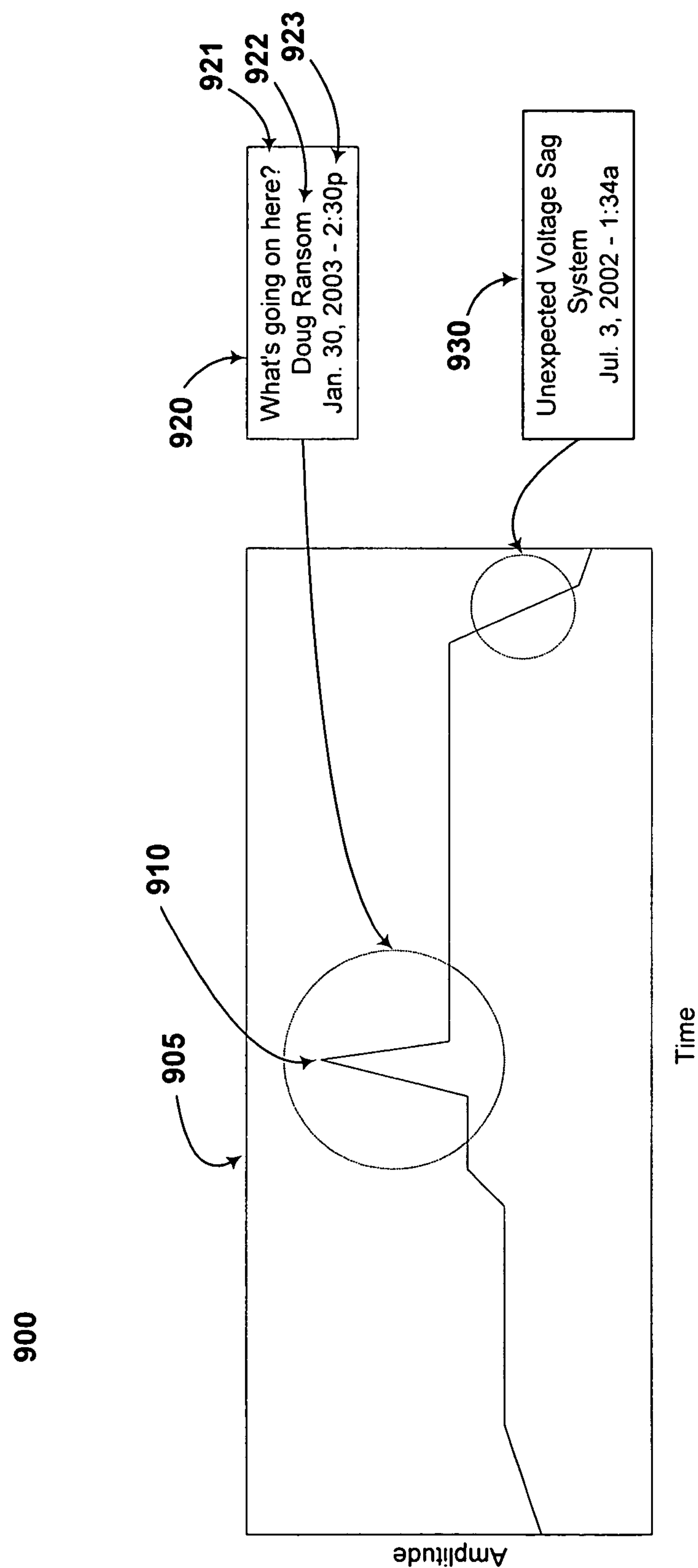
FIG. 18 depicts an exemplary EEM Annotation Analysis Graphical User Interface.

Referring now to FIG. 18, the disclosed embodiments may allow the user to make annotations on any reports and graphs displayed in an EEM Analysis GUI 900. One type of graph may be a zoomed waveform display 905. The zoomed waveform display 905 shows a portion of the waveform of a voltage or current signal in the power system. A user may notice an anomaly 910 in the waveform. The EEM software application allows the user to make an annotation 920 on the graph indicating that the anomaly is of some interest to them. The system may record the annotation including a note 921, a name 922 of the person submitting the note and a time 923 it was submitted, and other details about the graph or underlying data used to generate the graph. This information is stored in a format comprising scalar vector graphic ("SVG") format and Rich Data Format ("RDF"). The SVG is used to describe the region of interest on the graph. In addition, using Al capabilities, the system may make automatic annotations 930. It is well known in the art that RDF is a common and interoperable mechanism to serialize metadata using extensible markup language ("XML") as interchange syntax. These features allow people to analyze charts and graphs and visually mark up portions of the graph and combine with comments. Someone looking at the chart can use a tool that overlays the SVG markup or the chart to see what other comments are about.

The metadata and the SVG overlay may contain some data points or references to data points for the region plotted and the region highlighted in SVG. The metadata can be stored in an annotation database, energy management portal, in a web based server, and so forth in any format, and turned into RDF and SVG by processing when retrieved from the database. It will be appreciated that other specific technologies besides SVG and RDF can be used annotate regions of a graph and contain desired metadata.

Figure 19:
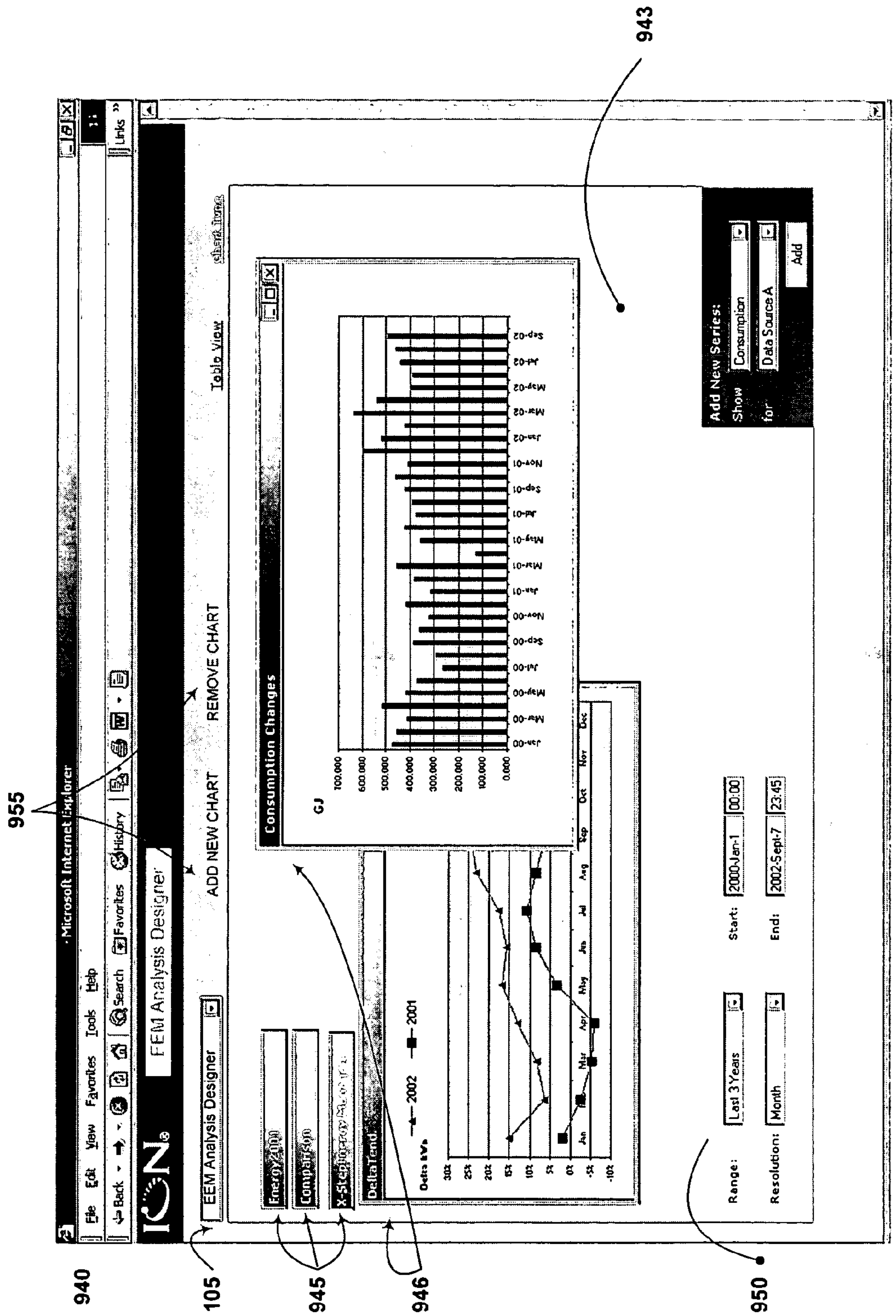
FIG. 19 depicts an exemplary EEM Analysis Designer.

Referring now to FIG. 19, an EEM Analysis Designer GUI 940 that may be generated by the EEM software application is illustrated as selected in EEM Analysis Control 105. The EEM Analysis Designer GUI 940 allows the user to have an area on the screen where they can graph and manipulate data in various chart windows. Many chart windows can be open in this area at the same time. The chart windows can be moved around and resized, and series can be dragged and dropped or otherwise moved from one chart to another. This tool allows the user to compare many different charts and parameters when they don't know yet what the relationships are and they need to analyze drivers. Once a chart is complete, it can be exported to another part of the system to become part of a dashboard or a report.

Chart windows can be minimized as is shown at 945, tiled as is shown at 946, or maximized to fill the charting area 943 of the Analysis Designer GUI 940. In the case where one chart is maximized, the other charts may be hidden, or may appear as small tabs on the side of the Analysis Designer GUI 940. A chart management controls 955 allow the user to add and remove charts. A control area 950 provides all the controls the user needs to manage the currently selected chart. These controls include all of the controls previously discussed, such as date-time controls, series management controls and so forth. The control area 950 may be context sensitive and change when the currently selected chart changes. The control area 950 reduces clutter by providing one place for controls, instead of having controls attached to each individual chart.

In one embodiment, the exchange of chart and graphical information using extensible stylesheet language transformations (XSLT) is facilitated. Chart tools execute on at least one computer. The user uses these tools, which include a GUI or programmatic interface to define the chart. The chart object generates an XSLT program that turns an XML infoset into a graphic display image using SVG. An XSLT enabled browser can then display the image (of the graph or chart) in SVG format without the need to run any client software beyond the browser.

In an alternate embodiment, the EEM software server 101 identifies the capabilities of the user agent and creates a representation of the data suitable for presentation to the user based on the type of user agent. If the user agent is a web browser capable as described in the previous embodiment, then the XSLT and data can be delivered to the browser and the browser can create an image. If the user agent is only capable of displaying other image types like PNG, GIF, or JPEG, then the images are created on the EEM software server 101. If the user agent cannot run XSLT, then the XSLT described above can run on the EEM software server 101. If the user agent is for presentation to the visually impaired, the server can repurpose the data in a manner best suited for their user agent; this might involve a Braille listing of the data, a simple summary of the data in English, or a representation that can work with some form of tactile display. It will be appreciated that the aforementioned embodiments can be implemented using alternate technologies.

Figure 20:
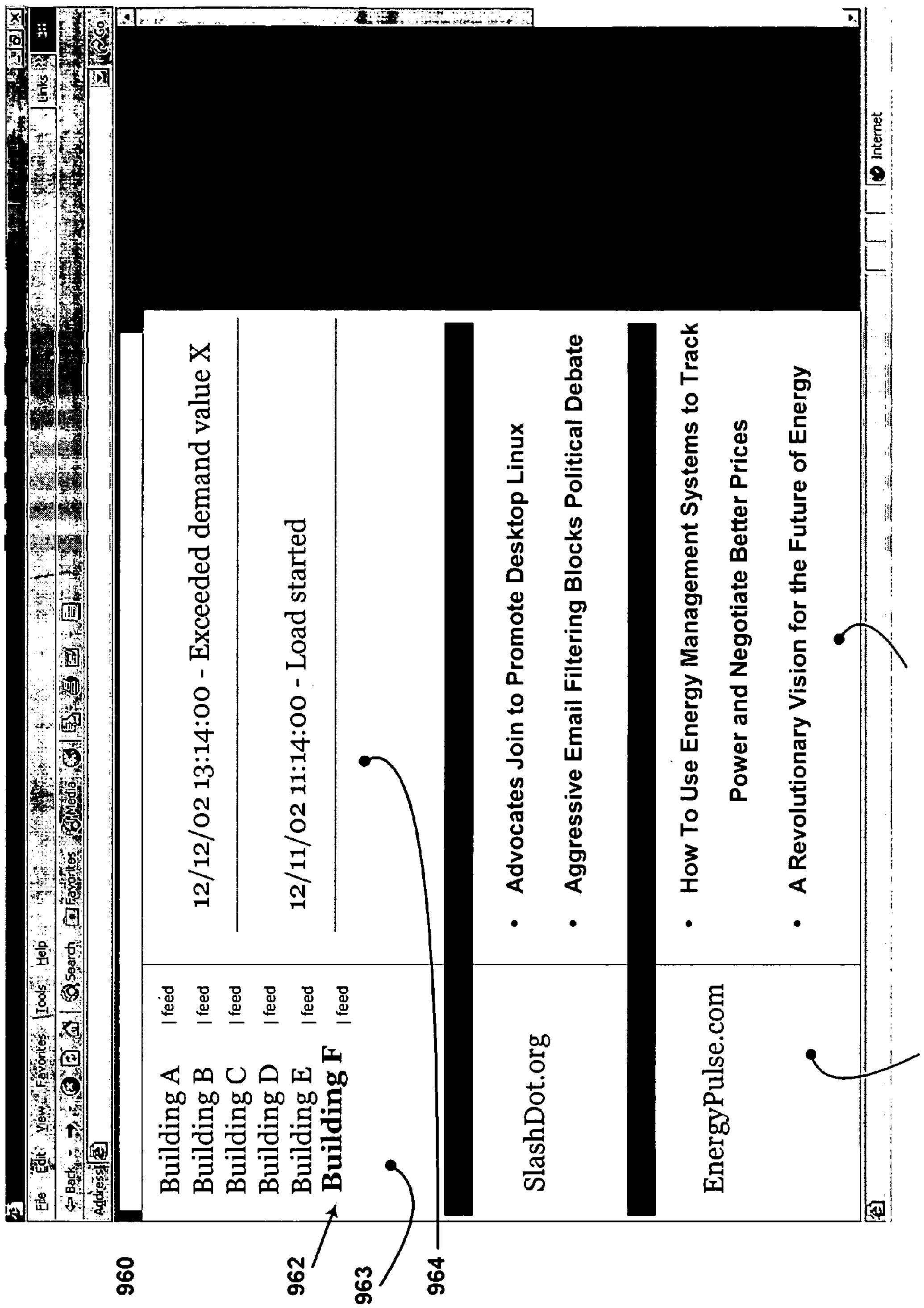
FIG. 20 depicts an exemplary EEM Notation and Analysis Graphical User Interface.

Referring now to FIG. 20, an Aggregation GUI 960, which may be web based, is also capable of being generated by the EES software application. The Aggregation GUI 960 may be a RSS aggregation view. RSS can stand for RDF Site Summary, Rich Site Summary, or Really Simple Syndication. All are similar file formats for the same basic purpose and RSS processors generally support all flavors of RSS. Most RSS software supports all of these. RDF Site Summary is the best version because RDF provides richer and more interoperable metadata. All RSS formats are currently serialized as XML 1.0. It will be appreciated that an equivalent system to RSS based aggregation can be built with Channel Definition Format, Microsoft Web Parts, Atom, and so forth. Sample PC based RSS aggregators include AGGIE and Amphetadesk. Newsisfree.com provides a web based RSS aggregation service. An RSS is a method of describing news, events or other web content that is available to web users.

The Aggregation GUI 960 allows the user to subscribe to feeds, which in turn provide summaries of recent changes on sites or loads the user is interested in. Feeds are usually specified by and retrieved with a universal resource identifier (e.g.—"HTTP URI"), but other ways can be used. The advantage of the aggregator is that the user can view summaries of what is new or changed on all the sites they have subscribed to on one summary view, usually presented as a web page instead of having to visit each of the sites they are interested in daily, as some users don't want to visit yet another portal daily nor do they want new events coming in through email. The summary view usually provides a mechanism to navigate from the summary of the change to the actually content to which the summary is about. Typical feeds currently available include headlines or summaries of press releases from certain companies, changes to Wikis, new content available on a web site, web log entries, current events, new items in a database, the results of some search engine query, and so forth.

The Aggregation GUI 960 is configured to aggregate and allow the user to view traditional supervisory control and data acquisition ("SCADA") alarms and notifications and/or relevant energy analytic alarms, points of interest or concern in addition to the users other interests. When a SCADA or energy management system provides energy management related events, or when something occurs users are interested in, a summary of the event is placed in a feed and made available to subscribers. The URI encodes the nature of data the user wishes to subscribe to, because they may only be interested in a subset of events in the system.

Although not illustrated in FIG. 20, during operation a user may start/stop a load, perform an alarm override or other manual function thereby causing a change in the systems load, power quality or other energy event related form. It is advantageous for another user to know what was done to cause these shifts, as a sudden energy or power consumption change may be noted during the data analysis and incorrect assumptions made as to why this occurred. Thus, when a user performs a function on equipment or programs that cause deviation from the current or normal monitored energy usage, the event is logged using something like sharepoint, Wiki, a web log (also known as a "blog"), an outlook folder, an energy management or SCADA system, etc., and the summary of the users log entry exposed via RSS. This occurs in one of two ways, both ways being time stamped on entry into whatever system is storing the information or even directly into a file, such as an RSS file.

If the RSS file is not created by the user, it can be generated periodically or on demand when referenced through a URI. First, the event (such as a load start/shutdown or demand overload) is automatically stored in the underlying system or directly in an RSS file. Second, the user manually updates the system or RSS file to indicate what operation was done during the event. In either case, an RSS file gives a user the ability to view events or operations on the system that occurred. Having this event RSS would allow one to review changes to the system and correlate them with energy events detected during the energy analysis of the system. Further, if the user needs more information than provided in the aggregated view, they can navigate to the actual event in the system.

The Aggregation GUI 960 may contain at least two display views or areas, a feed selection area 966 and a content summaries area 968. The area 963 contains the metering points or locations that the web aggregation GUI 960 is coupled with (i.e.—feeds). For example, Building F 962 refers to the energy data associated with the metering points or locations within Building F.

It will be appreciated that the feed selection area 966 and the content summaries area 968 are customizable and allow a user to add or remove metering points or locations as well as other content. In the area 963, a user is operative to select the "Building F" 962 link, and energy logs that were either manually entered by a user or automatically generated by the equipment are displayed in the content area 964.

In an alternate embodiment, a user may be able to subscribe to certain systems or standard events, allowing them to only see what they deem to be relevant information. For example, a plant manager may only wish to see any events that show exceeded demand and load start commands, indicating that a demand has been exceeded, but thereafter the demand was met when a load was started. Alternately, a user may subscribe to get alerts when certain logs are entered. This type of customizable summary allows one to aggregate meter sites and shows all relevant or interesting changes that occur at the sites that are both automatically and manually generated. Alternate feeds and content summaries of interest to the user are also shown.

In another alternative embodiment, an EM device can expose event summaries as an RSS feed. In small systems without dedicated EM software, a few devices can be monitored by someone, and if an event of interest occurs, the user can navigate from their RSS summary aggregation view to a page on the device to see event details.

In yet another alternative embodiment, a service provider can provide channels tuned to specific customers, which include energy management system events, consultants interpretation or comments on energy management events, bills, shadow bills, and relevant energy management news headlines or interesting items the service provider has deemed interesting to their subscriber. Providing these RSS feeds can be part of their financially compensated service. As illustrated in FIG. 20, the feed selection area 966 may also include a web site links, and the content summaries area 968 may include news headlines related to those web site links. The web site link area may provide a link for the user to jump to a more detailed description of the news item displayed in the news headline area.

It will be appreciated that although the view depicted here is a web browser view, that alternate views such Newsgator and SharpReader could provide a similar functionality.

Figure 21:
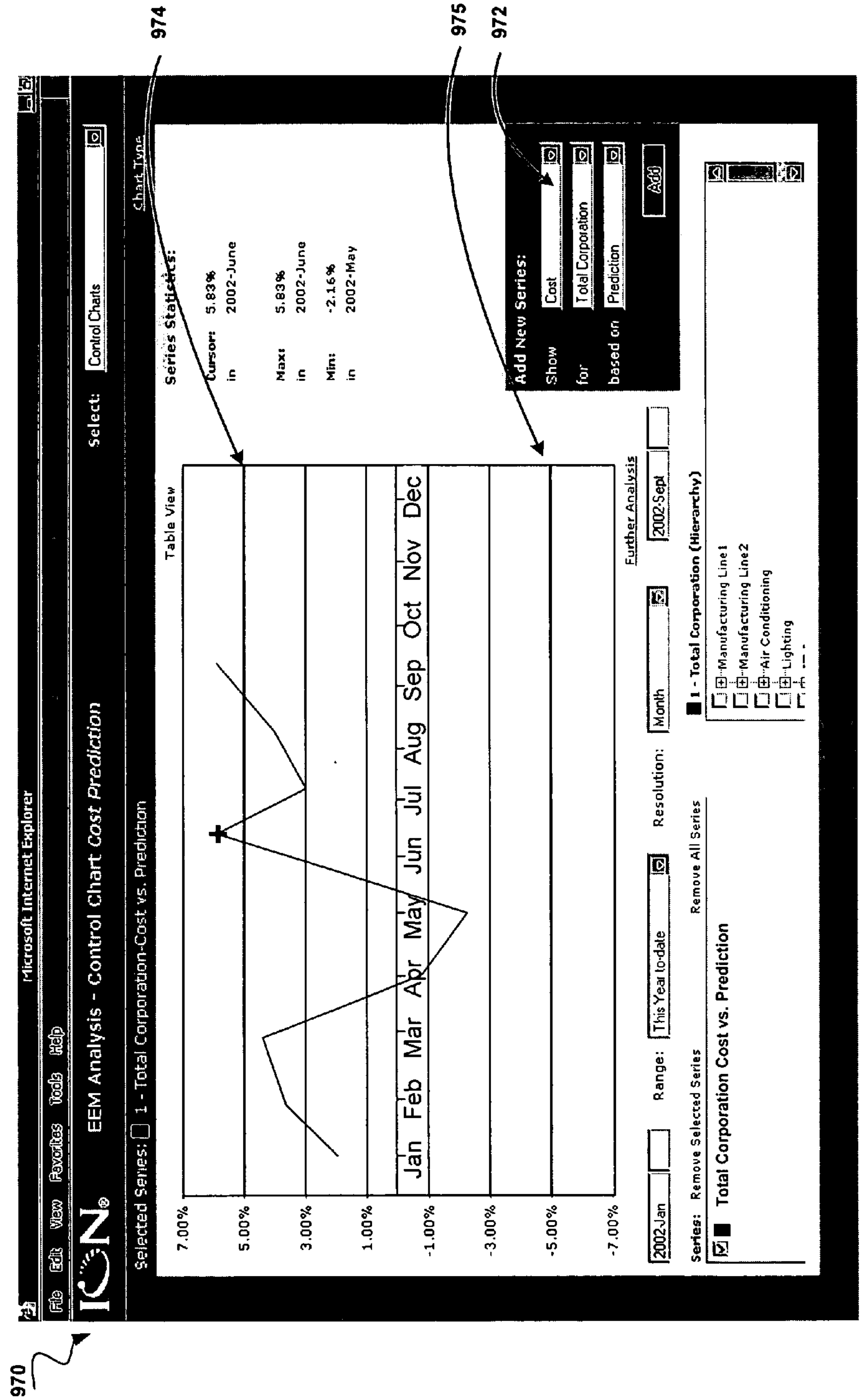
FIG. 21 depicts an exemplary EEM Control Analysis Graphical User Interface.

Referring to FIG. 21, the EEM software application may also be capable of generating a Control Chart EEM Analysis GUI 970. The Control Chart EEM Analysis GUI 970 may allow a variable 972 to be plotted along with thresholds 974, 975 that the user or system wanted the variable 972 to stay within. The thresholds 974, 975 may represent a prediction, and the variable 972 may represent an actual value. This allows the user to answer the question "How am I doing compared to plan?" For example, where the variable 972 represents actual cost, that actual cost may be compared to a prediction, and the difference between them is succinctly shown.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method of providing enterprise energy data over a network, the method comprising:

generating a polar coordinated plot on a display of a computing device;

generating at least one power line data value on the polar coordinated plot as a function of a power indication value monitored over a predetermined period of time;

generating a vector on the polar coordinated plot originating from a point of origin on the polar coordinated plot to the at least one power line data value;

adjusting a power level display on the display of the computing device as a function of the location of the vector to display a data value associated with the location of the vector; and further comprising plotting a tariff line data value on the polar coordinated plot as a function of the tariff structure.

2. The method of claim 1, further comprising generating a tariff vector on the polar coordinated plot originating from the point of origin of the polar coordinated plot to the tariff line data value.

3. The method of claim 2, further comprising allowing a user to adjust the position of the tariff vector thereby adjusting a tariff display value on the display of the computing device as a function of the location of the tariff vector.

4. A method of providing enterprise energy data over a network, the method comprising:

generating a polar coordinated plot on a display of a computing device;

generating at least one power line data value on the polar coordinated plot as a function of a power indication value monitored over a predetermined period of time;

generating a vector on the polar coordinated plot originating from a point of origin on the polar coordinated plot to the at least one power line data value;

adjusting a power level display on the display of the computing device as a function of the location of the vector to display a data value associated with the location of the vector, wherein the at least one power line data value may comprise an amount of power consumed at a pre-selected data source; and further comprising generating a cost line data value on the polar coordinated plot as a function of the amount of power consumed.

5. The method of claim 4, further comprising generating a cost vector on the polar coordinated plot originating from the point of origin of the polar coordinated plot to the cost line data value.

6. The method of claim 5, further comprising allowing a user to adjust the position of the cost vector thereby adjusting a cost display value on the display of the computing device as a function of the location of the cost vector.

7. A method of providing enterprise energy data over a network, the method comprising:

generating a polar coordinated plot on a display of a computing device;

generating at least one power line data value on the polar coordinated plot as a function of a power indication value monitored over a predetermined period of time;

generating a vector on the polar coordinated plot originating from a point of origin on the polar coordinated plot to the at least one power line data value;

adjusting a power level display on the display of the computing device as a function of the location of the vector to display a data value associated with the location of the vector; and further comprising generating a normalized power operations line data value on the polar coordinated plot.

8. A method of providing enterprise energy data over a network, the method comprising:

generating a polar coordinated plot on a display of a computing device;

generating at least one power line data value on the polar coordinated plot as a function of a power indication value monitored over a predetermined period of time;

generating a vector on the polar coordinated plot originating from a point of origin on the polar coordinated plot to the at least one power line data value; and adjusting a power level display on the display of the computing device as a function of the location of the vector to display a data value associated with the location of the vector, wherein the polar coordinated plot includes a horizontal axis and a vertical axis, wherein the horizontal axis and the vertical axis represent the predetermined period of time.

9. A computer program product for use in an enterprise energy management system, comprising:

computer readable program code for generating a polar coordinated plot having a horizontal axis and a vertical axis indicative of a predetermined period of time;

computer readable program code for obtaining a power line data value over the predetermined period of time from a enterprise energy management database;

computer readable program code for plotting the power line data value on the polar coordinated plot over the predetermined period of time;

computer readable program code for generating a vector on the polar coordinated plot stemming from a point of origin of the polar coordinated plot to the at least one power line data value; and computer readable program code for adjusting a power line display value associated with the power line data value as a function of the position of the vector.

10. The computer program product of claim 9 wherein the predetermined period of time is at least one of an hour, a shift, a day, a week, a month, a quarter and a year.

11. The computer program product of claim 9 further allowing a user to adjust the position of the vector on the polar coordinated plot.

12. The computer program product of claim 9, further comprising computer readable program code for obtaining a cost line data value over the predetermined period of time from the enterprise energy management database.

13. The computer program product of claim 12, further comprising computer readable program code for plotting the cost line data value on the polar coordinated plot over the predetermined period of time.

14. The computer program product of claim 13, further comprising computer readable program code for generating a cost vector on the polar coordinated plot originating from the point of origin of the polar coordinated plot to the cost line data value.

15. The computer program product of claim 14, further comprising computer readable program code for adjusting a cost display value associated with the cost line data value as a function of the position of the cost vector.

16. The computer program product of claim 9, further comprising computer readable program code for plotting a tariff line data value on the polar coordinated plot as a function of the tariff structure.

17. The computer program product of claim 16 further comprising computer readable program code for generating a tariff vector on the polar coordinated plot originating from the point of origin of the polar coordinated plot to the tariff line data value.

18. The computer program product of claim 17, further comprising computer readable program code for allowing a user to adjust the position of the tariff vector thereby adjusting a tariff display value on the display of the computing device as a function of the location of the tariff vector.

19. A computer program product for use in an enterprise energy management system, comprising:

computer readable program code for generating a polar coordinated plot having a horizontal axis and a vertical axis indicative of a predetermined period of time;

computer readable program code for obtaining line data value over the predetermined period of time from a enterprise energy management database;

computer readable program code for plotting the line data value on the polar coordinated plot over the predetermined period of time;

computer readable program code for generating a vector on the polar coordinated plot stemming from a point of origin of the polar coordinated plot to the at least one line data value; and computer readable program code for adjusting a line display value associated with the line data value as a function of the position of the vector.

20. The computer program product of claim 19 wherein the line data value is at least one of a cost line data value, a tariff line data value and a power line data value.

21. An enterprise energy management system, comprising:

means for displaying a polar coordinated plot on a display of a computing device;

means for plotting a plurality of power line data values on the polar coordinated plot as a function of a power indication value monitored over a predetermined period of time;

means for generating a vector on the polar coordinated plot stemming from a point of origin to the power line data values; and means for adjusting a power level display on the display of the computing device as a function of the position of the vector to display a data value associated with the position of the vector.

22. The enterprise energy management system of claim 21, further comprising means for allowing a user to adjust the position of the vector relative to the power line data values.

23. The enterprise energy management system of claim 21, further comprising means for plotting a plurality of cost line data values on the polar coordinated plot as a function of a cost indication value monitored over the predetermined period of time.

24. The enterprise energy management system of claim 23, further comprising means for generating a cost vector on the polar coordinated plot stemming from the point of origin to the cost line data values.

25. The enterprise energy management system of claim 24, further comprising means for allowing a user to adjust the position of the cost vector relative to the cost line data values.

26. The enterprise energy management system of claim 21, further comprising means for adjusting a cost level display on the display of computing device as a function of the position of the cost vector to display a second data value associated with the position of the cost vector.

27. The enterprise energy management system of claim 21, further comprising means for plotting a tariff line data value on the polar coordinated plot as a function of the tariff structure.

28. The enterprise energy management system of claim 21, further comprising means for generating a tariff vector on the polar coordinated plot originating from the point of origin of the polar coordinated plot to the tariff line data value.

29. The enterprise energy management system of claim 21, further comprising means for allowing a user to adjust the position of the tariff vector thereby adjusting a tariff display value on the display of the computing device as a function of the location of the tariff vector.

30. A method of providing event aggregation in an enterprise energy management system, the method comprising:

associating at least one feed with an energy consumption site having a load;

allowing a user to subscribe to the at least one feed;

displaying a viewer having a feed summary selection area and a content summary viewing area; and posting energy data events in the content summary viewing area as a function of the selection of a respective feed in the feed summary selection area.

31. The method of claim 30, wherein the load may be defined by the user to include a predetermined number of power consuming areas within a respective enterprise.

32. The method of claim 30, wherein the energy data events are generated as a function of recent changes in the load.

33. The method of claim 32, wherein the recent changes in the load may comprise at least one of a load start, a load stop, and a demand overload.

34. The method of claim 30, wherein the at least one feed displayed in the feed summary selection area is associated with a hyper text transfer protocol universal resource identifier that is functional to retrieve the energy data events associated with that respective load from an enterprise energy management database.

35. The method of claim 30, wherein the energy data events are generated as a function of a change made to a device associated with the load.

36. The method of claim 30 wherein the energy data events are written to an RSS file.

37. The method of claim 30, further comprising posting news data in the content summary viewing area as a function of the selection of a respective feed in the feed summary selection area.

38. The method of claim 30, further comprising posting webpage data in the content summary viewing area as a function of the selection of a respective feed in the feed summary selection area.

39. A computer program product for use in an enterprise energy management system, comprising:

computer readable program code for associating at least one feed with an energy consumption site having a load, wherein the load may be defined by the user to include a predetermined number of power consuming areas within a respective enterprise;

computer readable program code for allowing a user to subscribe to the at least one feed;

computer readable program code for displaying a viewer having a feed summary selection area and a content summary viewing area; and computer readable program code for posting energy data events in the content summary viewing area that are associated with at least one feed as a function of the selection of a respective feed in the feed summary selection area.

40. The computer program product of claim 39, wherein the energy data events are generated as a function of recent changes in the load.

41. The computer program product of claim 39, wherein the recent changes in the load may comprise a load start, a load stop, and a demand overload.

42. The computer program product of claim 39, wherein the at least one feed displayed in the feed summary selection area is associated with a hyper text transfer protocol universal resource identifier that is functional to retrieve the energy data events associated with that respective load from an enterprise energy management database.

43. The computer program product of claim 39, further comprising computer readable program code for allowing the user to stop the load based on an evaluation of the energy data events.

44. The computer program product of claim 39 wherein the energy data events are generated as a function of a change made to a device associated with the load.

45. The computer program product of claim 39, wherein the energy data events are written to an RSS file.

46. An energy enterprise management system comprising:

means for associating at least one feed with an energy consumption site having a load;

means for allowing a user to subscribe to at least one feed;

means for displaying a viewer having a feed summary selection area and a content summary viewing area; and means for posting energy data events in the content summary viewing area that are associated with at least one feed as a function of the selection of a respective feed in the feed summary selection area.

47. An computer program product for use in an enterprise energy management system, the computer program product comprising:

computer readable program code for displaying an interactive natural language interface query to a user of a computer device on a display;

computer readable program code for generating and displaying a first set of energy data on a polar coordinated plot on the display of the computer device;

computer readable program code for providing a load shifting analysis of a second set of energy data between a first time period and a second time period; and computer readable program code for generating and displaying event aggregation of a third set of energy data.

* * * * *